United States Patent
Fujikawa et al.

(10) Patent No.: US 9,229,585 B2
(45) Date of Patent: Jan. 5, 2016

(54) PROJECTION SYSTEM, IMAGE GENERATING METHOD, AND COMPUTER-READABLE STORAGE MEDIUM

(71) Applicants: Kazuya Fujikawa, Kanagawa (JP); Toshihiro Isozaki, Kanagawa (JP); Kazuhide Tanabe, Tokyo (JP); Makoto Sugino, Kanagawa (JP); Hiroshi Kobayashi, Kanagawa (JP); Ryouji Yamamoto, Kanagawa (JP)

(72) Inventors: Kazuya Fujikawa, Kanagawa (JP); Toshihiro Isozaki, Kanagawa (JP); Kazuhide Tanabe, Tokyo (JP); Makoto Sugino, Kanagawa (JP); Hiroshi Kobayashi, Kanagawa (JP); Ryouji Yamamoto, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 31 days.

(21) Appl. No.: 14/169,551

(22) Filed: Jan. 31, 2014

(65) Prior Publication Data

US 2014/0225870 A1    Aug. 14, 2014

(30) Foreign Application Priority Data

Feb. 8, 2013   (JP) ................................. 2013-023632

(51) Int. Cl.
*G06F 3/042*    (2006.01)
(52) U.S. Cl.
CPC .................................... *G06F 3/0425* (2013.01)
(58) Field of Classification Search
CPC ....... G06F 3/0425; G06F 3/005; G06F 3/011; G06F 3/017; G06F 3/0426; G02B 27/017; G02B 27/0172; G02B 2027/0138; G02B 2027/0178

USPC ....................... 345/8, 175, 633; 382/103, 311
See application file for complete search history.

(56) References Cited

U.S. PATENT DOCUMENTS

| | | |
|---|---|---|
| 4,413,297 A | 11/1983 | Tanaka et al. |
| 4,466,004 A | 8/1984 | Kobayashi et al. |
| 4,544,602 A | 10/1985 | Kobayashi et al. |
| 4,823,001 A | 4/1989 | Kobayashi et al. |

(Continued)

FOREIGN PATENT DOCUMENTS

| | | |
|---|---|---|
| JP | 2005-339269 | 12/2005 |
| JP | 4710734 | 4/2011 |

OTHER PUBLICATIONS

U.S. Appl. No. 07/012,826, filed Feb. 10, 1987.

(Continued)

*Primary Examiner* — Tom Sheng
(74) *Attorney, Agent, or Firm* — Oblon, McClelland, Maier & Neustadt, L.L.P.

(57) ABSTRACT

A projection system includes a projection unit configured to project a projected image on a surface for projection; an image capturing unit configured to capture an image of an image-capturing area representing an area; an operation detection unit configured to detect any user operation on an operation target image representing a targeted image for the user operation by using the captured image; a calculation unit configured to calculate image-capturing area coordinates for specifying a position of the image-capturing area in the projected image based on the captured image and the projected image; a position determination unit configured to determine a position of the operation target image in the projected image based on the image-capturing area coordinates; and a projected image generating unit configured to generate a projected image in which the operation target image is laid out on the determined position.

17 Claims, 22 Drawing Sheets

(56) References Cited

U.S. PATENT DOCUMENTS

| | | | |
|---|---|---|---|
| 4,840,922 A | 6/1989 | Kobayashi et al. | |
| 4,855,256 A | 8/1989 | Kobayashi et al. | |
| 4,987,299 A | 1/1991 | Kobayashi et al. | |
| 5,148,019 A | 9/1992 | Kobayashi et al. | |
| 5,355,220 A | 10/1994 | Kobayashi et al. | |
| 8,094,090 B2* | 1/2012 | Fisher et al. | 345/8 |
| 8,320,709 B2* | 11/2012 | Aratani et al. | 382/291 |
| 8,878,821 B2* | 11/2014 | Robinson | G06F 3/0425 345/174 |
| 2002/0097247 A1* | 7/2002 | Ohba | 345/501 |
| 2006/0251452 A1 | 11/2006 | Isozaki | |
| 2007/0041659 A1* | 2/2007 | Nobori | B60R 1/00 382/284 |
| 2007/0154116 A1* | 7/2007 | Shieh | 382/314 |
| 2007/0219839 A1 | 9/2007 | Tanabe | |
| 2007/0286630 A1 | 12/2007 | Watanabe et al. | |
| 2008/0178199 A1 | 7/2008 | Tanabe | |
| 2009/0064201 A1 | 3/2009 | Tanabe | |
| 2009/0089076 A1 | 4/2009 | Asakimori et al. | |
| 2009/0109474 A1 | 4/2009 | Tanabe et al. | |
| 2009/0193181 A1 | 7/2009 | Sugino | |
| 2009/0237735 A1 | 9/2009 | Yamamoto | |
| 2010/0070750 A1 | 3/2010 | Yamamoto | |
| 2010/0238507 A1 | 9/2010 | Matsushima et al. | |
| 2010/0277489 A1* | 11/2010 | Geisner et al. | 345/581 |
| 2011/0007365 A1 | 1/2011 | Yukumoto et al. | |
| 2011/0016464 A1 | 1/2011 | Tamura et al. | |
| 2011/0063645 A1 | 3/2011 | Sugino | |
| 2011/0161652 A1 | 6/2011 | Ogura et al. | |
| 2011/0242053 A1* | 10/2011 | Chiu | 345/175 |
| 2011/0254810 A1* | 10/2011 | Lee et al. | 345/175 |
| 2011/0279847 A1 | 11/2011 | Kakoi et al. | |
| 2011/0305368 A1* | 12/2011 | Osako | 382/103 |
| 2012/0219177 A1* | 8/2012 | Osako | 382/103 |
| 2012/0293518 A1* | 11/2012 | Geisner et al. | 345/474 |
| 2012/0309532 A1* | 12/2012 | Ambrus et al. | 463/36 |
| 2013/0047190 A1 | 2/2013 | Suzuki et al. | |
| 2013/0166791 A1 | 6/2013 | Kobayashi | |
| 2013/0322785 A1* | 12/2013 | Kamamori | 382/311 |
| 2014/0337807 A1* | 11/2014 | Shigeta et al. | 715/863 |

OTHER PUBLICATIONS

U.S. Appl. No. 07/435,977, filed Nov. 13, 1989.
U.S. Appl. No. 07/724,483, filed Jun. 28, 1991.

* cited by examiner

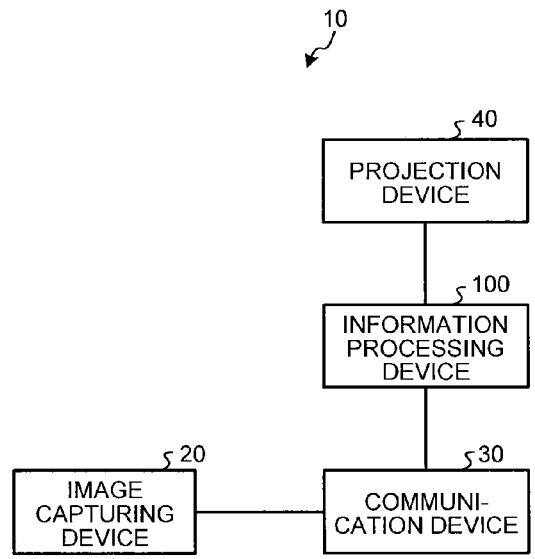
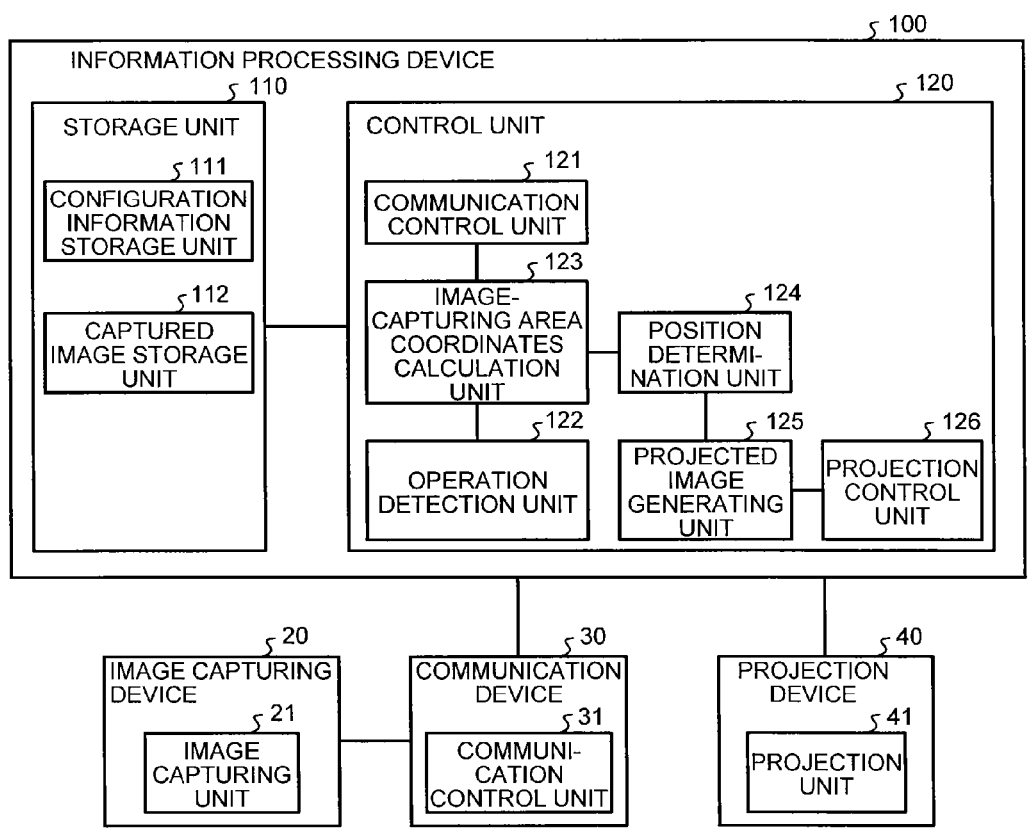

PROJECTION SYSTEM, IMAGE GENERATING METHOD, AND COMPUTER-READABLE STORAGE MEDIUM

CROSS-REFERENCE TO RELATED APPLICATIONS

The present application claims priority to and incorporates by reference the entire contents of Japanese Patent Application No. 2013-023632 filed in Japan on Feb. 8, 2013.

BACKGROUND OF THE INVENTION

1. Field of the Invention

The present invention relates to a projection system, an image generating method, and a computer-readable storage medium.

2. Description of the Related Art

Conventional technologies for operating projection devices have been known, in which a pointing position is moved using a pointing device such as an electronic pen on a projected image projected on the surface for projection such as a screen by projection devices such as a projector. By contrast, with some technologies, projection devices can be operated without using a pointing device. For example, a technology has been known, in which a predetermined action of a user, i.e., a gesture is recognized by a camera and the operation corresponding to the gesture is executed on the projection device. With another technology, if a user performs an action for operating a target for operation such as a button included in the projected image, the action is recognized by a camera and the process corresponding to the operation on the target for operation is executed on the projection device. These technologies are assumed to be used for a presentation in a meeting or a display of content information to a user in a shop.

With the technologies, it is preferable that the current pointing position can be detected with high accuracy based on operations on projection devices operated according to the pointing positions in projected images. Examples of technologies for detecting pointing positions with high accuracy include the following: a predetermined position on the surface for projection is marked, the marked image is stored, then the marked image and the current projected image are compared to each other for detecting the pointing position. With this technology, the current pointing position can be detected without always displaying the marker.

In the conventional technologies, however, some user operations on projection devices cannot be detected. Specifically, if a projection device is operated by recognizing a user action by a camera and if an image-capturing area in which the camera can capture images is smaller than the projected image, some operations on the projection device cannot be detected. The image-capturing area is smaller than the projected image when the surface for projection and the camera are close to each other, that is, the distance between the surface for projection and the camera is too short. That is, when using a projection device for the purpose of presentation or display of content information and if no sufficient distance between the surface for projection and the camera can be ensured, the above-described issue may occur.

Therefore, there is a need to provide a projection system, an image generating method, and a computer-readable storage medium that can improve detection accuracy of a user operation on a projection device.

SUMMARY OF THE INVENTION

It is an object of the present invention to at least partially solve the problems in the conventional technology.

According to an embodiment, there is provided a projection system that includes a projection unit configured to project a projected image on a surface for projection; an image capturing unit configured to capture an image-capturing area representing an area in which images are capturable and generate a captured image; an operation detection unit configured to detect any user operation on an operation target image representing a targeted image for the user operation by using the captured image; an image-capturing area coordinates calculation unit configured to calculate image-capturing area coordinates for specifying a position of the image-capturing area in the projected image based on the captured image and the projected image when any user operation is detected for the operation target image; a position determination unit configured to determine a position of the operation target image in the projected image based on the image-capturing area coordinates; a projected image generating unit configured to generate a projected image in which the operation target image is laid out on the determined position; and a projection control unit configured to control the projection unit to project the projected image.

According to another embodiment, there is provided an image generating method that includes detecting a user operation on an operation target image serving as an image targeted for a user operation by using a captured image obtained by capturing an image-capturing area representing an area in which images are capturable; calculating image-capturing area coordinates for specifying a position of the image-capturing area in the projected image based on the captured image and the projected image when any user operation is detected for the operation target image; determining a position of the operation target image in the projected image based on the image-capturing area coordinates; generating a projected image in which the operation target image is laid out on the determined position; and controlling a projection device to project a projected image.

According to still another embodiment, there is provided a non-transitory computer-readable storage medium with an executable program stored thereon and executed by a computer. The program instructs the computer to perform: detecting a user operation on an operation target image serving as an image targeted for a user operation by using a captured image obtained by capturing an image-capturing area representing an area in which images are capturable; calculating image-capturing area coordinates for specifying a position of the image-capturing area in a projected image based on the captured image and the projected image when any user operation is detected for the operation target image; determining a position of the operation target image in the projected image based on the image-capturing area coordinates; generating a projected image in which the operation target image is laid out on the determined position; and controlling a projection device to project a projected image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating a configuration example of a projection system according to an embodiment of the present invention;

FIG. 2 is a functional block diagram illustrating a configuration example of a device according to a first embodiment of the present invention;

DETAILED DESCRIPTION OF THE PREFERRED EMBODIMENTS

Figure 3:
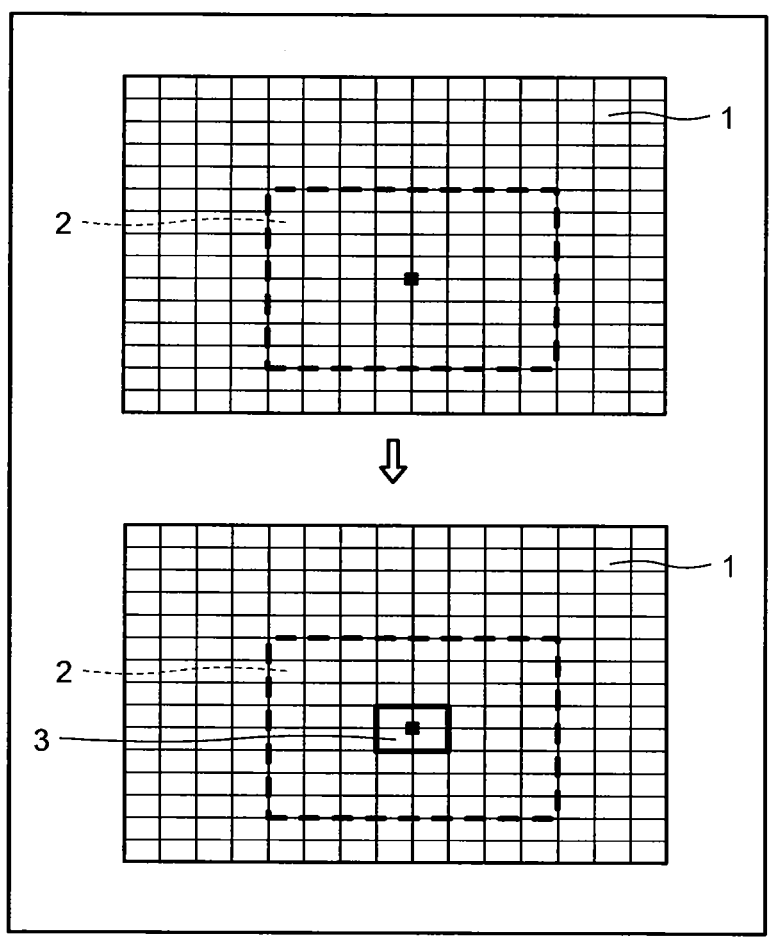
FIG. 3 is a diagram illustrating a layout example of a button image according to the first embodiment.

The following describes embodiments of a projection system, an image generating program, an information processing device, and a method of generating images according to the present invention with reference to the accompanying drawings. The embodiments herein are not intended to limit the scope of the invention. The embodiments can be combined appropriately as long as the details of the embodiments are not contradictory to each other.

First Embodiment

System Configuration

The following describes a configuration of a projection system according to a first embodiment of the present invention with reference to FIG. 1. FIG. 1 is a diagram illustrating a configuration example of a projection system according to the first embodiment.

As illustrated in FIG. 1, a projection system 10 includes an image capturing device 20, a communication device 30, a projection device 40, and an information processing device 100. The image capturing device 20 is a camera or the like that captures an image for projection, i.e., projected images projected on a surface for projection and generates a captured image. The image capturing device 20 is coupled to the communication device 30. The area in which the image capturing device 20 can capture images may be referred to as an "image-capturing area", hereinafter. The image-capturing area has various sizes depending on the distance between the image capturing device 20 and the surface for projection. The communication device 30 is a communication device that transmits the captured image generated by the image capturing device 20 to the information processing device 100. The communication device 30 has a memory for temporarily storing the captured image therein. The communication device 30 acquires the captured image from the memory and transmits the acquired image to the information processing device 100. The projection device 40 is a projector, for example, that projects projected images on the surface for projection. The projection device 40 is coupled to the information processing device 100.

The information processing device 100 is a server device, for example, that generates projected images and controls the projection device 40 to project the projected images. The projected image is generated when the power source of the projection device 40 is turned on or a user operation is detected on the projected image. User operations are detected by using a captured image obtained by capturing the image-capturing area. In order to detect a user operation and achieve the user operation in the projected image, the image-capturing area therefore needs to include a target image for operation (an operation target image) such as a button image targeted for the user operation. The information processing device 100 thus generates a projected image so that the image-capturing area encompasses the operation target image, thereby achieving the user operation in the projected image. The devices described above are coupled to a wired or wireless network such as a local area network (LAN) or the Internet.

The projection system 10 is utilized for the purpose of presentation in a meeting or display of content information to a user in a shop. The user performs user operations, that is, the user approaches or touches a button image provided in the projected image by hand, for example. Performing such a user operation corresponds to an operation that is performed on the button image, thereby achieving switching of projected images, for example, according to the performed operation. As described above, a sufficient distance cannot always be ensured between the surface for projection and the image capturing device 20 depending on the use of the projection system 10. This may make the image-capturing area smaller than the projected image. For this reason, the information processing device 100 generates a projected image so that the image-capturing area encompasses an operation target image such as a button image.

Configuration of Device According to First Embodiment

The following describes a configuration of a device according to the first embodiment with reference to FIG. 2. FIG. 2 is a functional block diagram illustrating a configuration example of the device according to the first embodiment.

As illustrated in FIG. 2, the image capturing device 20 has an image capturing unit 21 that captures the image-capturing area serving as an area in which an image can be captured and generates the captured image. The image capturing unit 21 then transmits the generated captured image to the communication device 30. Because the captured image is obtained by capturing the image-capturing area, some captured images may fail to encompass the projected image depending on the distance between the image capturing device 20 and the surface for projection. The communication device 30 has a communication control unit 31 that transmits the captured image generated by the image capturing device 20 to the information processing device 100. The projection device 40 has a projection unit 41 that projects the projected image on the surface for projection under the control of the information processing device 100.

The information processing device 100 has a storage unit 110 and a control unit 120. The storage unit 110 stores therein data used in various types of processes performed by the control unit 120 and results of the various types of processes obtained by the control unit 120. The storage unit 110 has a configuration information storage unit 111 and a captured image storage unit 112. The storage unit 110 is a semiconductor memory device such as a random access memory (RAM), a read only memory (ROM), and a flash memory, or a storage device such as a hard disk and an optical disc.

The configuration information storage unit 111 stores therein the configuration information of the projected image projected on the surface for projection. Specifically, the configuration information of the projected image is the information for layout of the projected image including a button image, a character image, and other various types of objects. The configuration information of the projected image is image data of the projected image that may or may not include a button image. If the image data of the projected image includes any button image, a new layout position of the button image that has been already laid out in the projected image is determined through the process described below. If the image data of the projected image includes no button image, a layout position of the button image in the projected image is determined through the process described below. The button image may be stored in the configuration information storage unit 111 or obtained from an external storage device. At least information on the size (the width and the height) of the button image is stored in the configuration information storage unit 111 or other external storage devices together with the button image. The captured image storage unit 112 stores therein the captured image generated by the image capturing device 20.

The control unit 120 has an internal memory for storing a control program, a computer program that specifies various types of processing procedures, for example, and necessary data. The control unit 120 has a communication control unit 121, an operation detection unit 122, an image-capturing area coordinates calculation unit 123, a position determination unit 124, a projected image generating unit 125, and a projection control unit 126. The control unit 120 is an integrated circuit such as an application specific integrated circuit (ASIC) and a field programmable gate array (FPGA), or an electronic circuit such as a central processing unit (CPU) and a micro processing unit (MPU). The whole of or a part of the units and components described above may be a software circuit (a computer program) or a hardware circuit as described above.

The communication control unit 121 controls the communication performed by the information processing device 100. More specifically, the communication control unit 121 receives the captured image generated by the image capturing device 20 and transmitted by the communication device 30. The received captured image is stored in the captured image storage unit 112. The communication control unit 121 receives information that the power source of the projection device 40 is turned on from the projection device 40 and notifies the image-capturing area coordinates calculation unit 123 of the turning on of the power source of the projection device 40. The information processing device 100 starts a generating process for a projected image to be projected on the surface for projection following the turning on of the power source of the projection device 40.

The operation detection unit 122 detects any user operation on the operation target image. More specifically, the operation detection unit 122 acquires the captured image from the captured image storage unit 112 and detects any user operation on a button image serving as an operation target image in the obtained captured image. The operation detection unit 122 then notifies the image-capturing area coordinates calculation unit 123 of detecting a user operation. The information processing device 100 starts the generating process for a new projected image projected on the surface for projection in order to switch projected images in response to the user operation on the button image.

The image-capturing area coordinates calculation unit 123 calculates image-capturing area coordinates representing the coordinates for specifying the position of the image-capturing area in the projected image. More specifically, the image-capturing area coordinates calculation unit 123 calculates the vertex coordinates of the image-capturing area in the projected image when the lower left vertex coordinates of the projected image is determined (0, 0), triggered by turning on the power source of the projection device 40 or detecting the user operation. The vertex coordinates of the image-capturing area in the projected image is an example of image-capturing area coordinates. The vertex coordinates of the image-capturing area can be obtained from the configuration information stored in the configuration information storage unit 111 and the captured image stored in the captured image storage unit 112. If the image-capturing area forms a rectangle shape, all of the vertex coordinates may be calculated or two or three points of the vertex coordinates corresponding to the diagonals of the rectangle may be calculated. In this case, the residual vertex coordinates can also be calculated from the calculated points of the vertex coordinates. The coordinates (0, 0) determined for the lower left vertex coordinates of the projected image are provided merely for exemplary purpose and any one of the vertex coordinates of the projected image can be determined as the coordinates (0, 0). The lower left vertex coordinates of the projected image are determined as the coordinates (0, 0) for example, hereinafter. If the vertex coordinates of the image-capturing area are preliminarily known or have already been calculated, the process executed by the image-capturing area coordinates calculation unit 123 may be omitted.

The position determination unit 124 determines the position of the operation target image to be laid out in the projected image. More specifically, the position determination unit 124 calculates the coordinates of the center of gravity of the image-capturing area from the vertex coordinates of the image-capturing area calculated by the image-capturing area coordinates calculation unit 123. The position determination unit 124 calculates the vertex coordinates of the button image when the center of gravity of the button image is superimposed onto the coordinates of the center of gravity of the image-capturing area, thereby determining the position of the button image. The vertex coordinates of the button image serves as operation target coordinates for specifying the position of the operation target image in the projected image.

The following describes an example of a position determining process performed by the position determination unit 124. The coordinates of the center of gravity of the image-capturing area is obtained by calculating the middle point coordinates of the vertex coordinates of the image-capturing area in the x direction and the middle point coordinates of the vertex coordinates of the image-capturing area in the y direction as described above. The vertex coordinates of the button image when the center of gravity of the button image is superimposed onto the coordinates of the center of gravity of the image-capturing area is also calculated from the coordinates of the center of gravity of the image-capturing area and the size (the width and the height) of the button image. The width and the height of the button image can be obtained from the configuration information of the projected image. The height of the button image indicates the y direction and the width of the button image indicates the x direction.

The coordinates of the center of gravity of the image-capturing area are represented by the following expressions:

"the x-coordinate=(the x-coordinate of the lower left vertex of the image-capturing area+the x-coordinate of the upper right vertex of the image-capturing area)/2"

"the y-coordinate=(the y-coordinate of the lower left vertex of the image-capturing area+the y-coordinate of the upper right vertex of the image-capturing area)/2"

The vertex coordinates of the button image are represented by the following expressions:

"the x-coordinate of the lower left vertex of the button image=the x-coordinate of the center of gravity of the image-capturing area–the width of the button image/2"

"the y-coordinate of the lower left vertex of the button image=the y-coordinate of the center of gravity of the image-capturing area–the height of the button image/2"

"the x-coordinate of the upper left vertex of the button image=the x-coordinate of the center of gravity of the image-capturing area–the width of the button image/2"

"the y-coordinate of the upper left vertex of the button image=the y-coordinate of the center of gravity of the image-capturing area+the height of the button image/2"

"the x-coordinate of the lower right vertex of the button image=the x-coordinate of the center of gravity of the image-capturing area+the width of the button image/2"

"the y-coordinate of the lower right vertex of the button image=the y-coordinate of the center of gravity of the image-capturing area–the height of the button image/2"

"the x-coordinate of the upper right vertex of the button image=the x-coordinate of the center of gravity of the image-capturing area+the width of the button image/2"

"the y-coordinate of the upper right vertex of the button image=the y-coordinate of the center of gravity of the image-capturing area+the height of the button image/2"

The projected image generating unit 125 generates the projected image in which the operation target image is laid out. More specifically, the projected image generating unit 125 generates the projected image in which the button image is laid out based on the vertex coordinates of the button image determined by the position determination unit 124 and the configuration information of the projected image stored in the configuration information storage unit 111.

FIG. 3 is a diagram illustrating a layout example of the button image according to the first embodiment. In the example illustrated in the upper diagram in FIG. 3, the four vertex coordinates of the image-capturing area 2 indicate (4, 2), (4, 10), (12, 2), and (12, 10), respectively. The projected image 1 includes the image-capturing area 2 having the above-described vertex coordinates. The size of the button image has a width of "2" and a height of "2".

In the above-described state, the position determination unit 124 calculates the coordinates of the center of gravity of the image-capturing area 2 based on the vertex coordinates of the image-capturing area 2 as follows: "the x-coordinate=(4+12)/2=8, the y-coordinate=(2+10)/2=6". In FIG. 3, the coordinates of the center of gravity of the image-capturing area 2 is represented with a black square. The position determination unit 124 calculates the vertex coordinates of the button image when the center of gravity of the button image is superimposed onto the center of gravity of the image-capturing area 2 based on the coordinates of the center of gravity of the image-capturing area 2 (8, 6), and a width of the button image "2" and a height of the button image "2", thereby determining the position of the button image in the projected image 1.

Specifically, the position determination unit 124 calculates the following: "the x-coordinate of the lower left vertex of the button image=8–2/2=7" and "the y-coordinate of the lower left vertex of the button image=6–2/2=5". In the same manner, the position determination unit 124 calculates the following: "the x-coordinate of the upper left vertex of the button image=8–2/2=7" and "the y-coordinate of the upper left vertex of the button image=6+2/2=7". In the same manner, the position determination unit 124 calculates the following: "the x-coordinate of the lower right vertex of the button image=8+2/2=9" and "the y-coordinate of the lower right vertex of the button image=6–2/2=5". In the same manner, the position determination unit 124 calculates the following: "the x-coordinate of the upper right vertex of the button image=8+2/2=9" and "the y-coordinate of the upper right vertex of the button image=6+2/2=7".

The projected image generating unit 125 generates the projected image 1 in which the button image is laid out based on the vertex coordinates of the button image determined by the position determination unit 124 and the configuration information of the projected image 1. As a result, as illustrated in the lower diagram in FIG. 3, the projected image 1 is thus generated by superimposing the center of gravity of the button image 3 having a width of "2" and a height of "2" onto the coordinates of the center of gravity of the image-capturing area 2 (8, 6).

The projection control unit 126 controls the projection device 40 to project the projected image. More specifically, the projection control unit 126 controls the projection unit 41 to project the projected image generated by the projected image generating unit 125.

Flow of Image Generating Process According to First Embodiment

Figure 4:
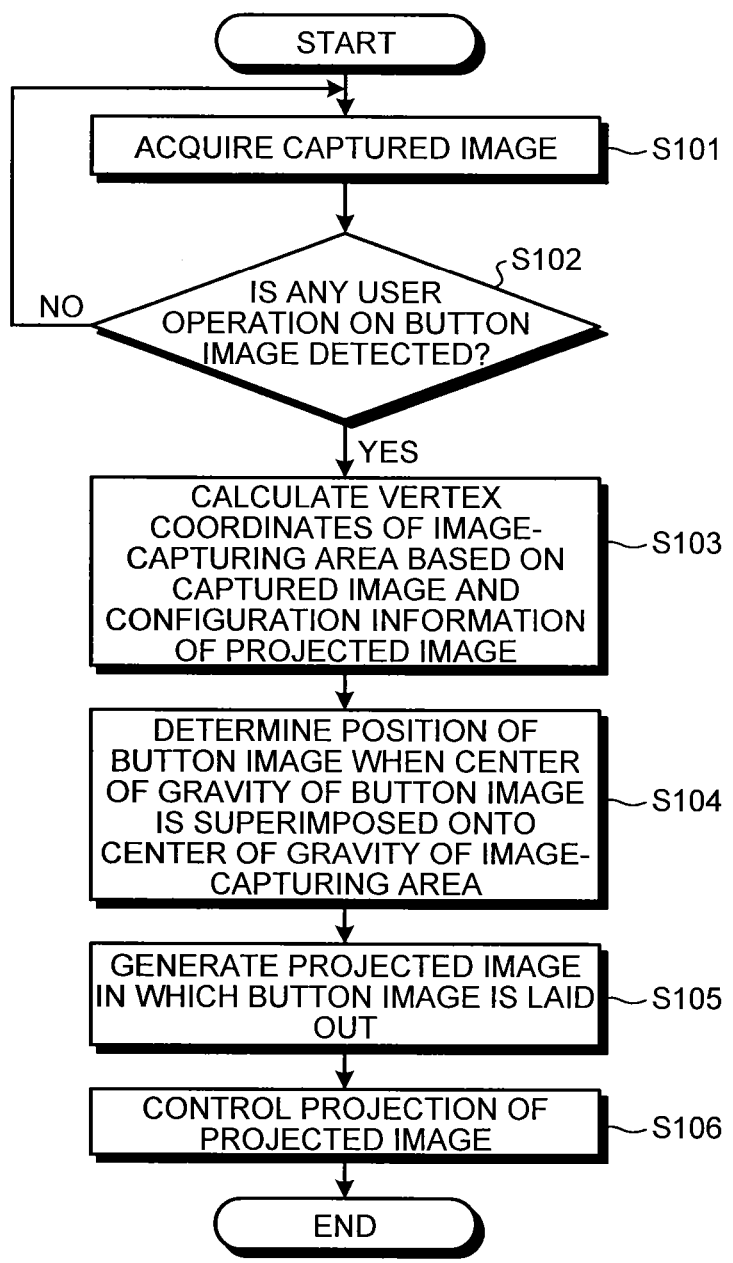
FIG. 4 is a flowchart illustrating a flow of an image generating process according to the first embodiment.

The following describes a flow of an image generating process according to the first embodiment with reference to FIG. 4. FIG. 4 is a flowchart illustrating a flow of the image generating process according to the first embodiment. In the example illustrated in FIG. 4, the image generating process is started triggered by detecting a user operation.

As illustrated in FIG. 4, the operation detection unit 122 acquires a captured image from the captured image storage unit 112 (Step S101). The operation detection unit 122 attempts to detect any user operation on the button image from the captured image (Step S102). If the operation detection unit 122 detects any user operation on the button image (Yes at Step S102), the image-capturing area coordinates calculation unit 123 calculates the vertex coordinates of the image-capturing area based on the captured image and the configuration information of the projected image stored in the configuration information storage unit 111 (Step S103). If the operation detection unit 122 detects no user operation on the button image (No at Step S102), the process at Step S101 is executed.

The position determination unit 124 calculates the coordinates of the center of gravity of the image-capturing area based on the vertex coordinates of the image-capturing area. The position determination unit 124 then calculates the vertex coordinates of the button image when the center of gravity of the button image is superimposed onto the center of gravity of the image-capturing area based on the width and the height of the button image and the calculated coordinates of the center of gravity of the image-capturing area, thereby determining the position of the button image in the projected image (Step S104). The projected image generating unit 125 generates the projected image in which the button image is laid out based on the vertex coordinates of the button image determined by the position determination unit 124 and the configuration information of the projected image (Step S105). After that, the projection control unit 126 controls the projection device 40 to project the projected image generated by the projected image generating unit 125 (Step S106).

Effects of First Embodiment

The information processing device 100 determines the position of the button image in the projected image when the center of gravity of the button image is superimposed onto the center of gravity of the image-capturing area. The information processing device 100 then generates a projected image in which the button image is laid out on the determined position. As a result, if a sufficient distance cannot be ensured between the surface for projection and the projection device 40, the information processing device 100 can improve detection accuracy of a user operation on the projection device 40. In other words, the information processing device 100 generates the projected image so that the image-capturing area in which user operations can be detected includes the button image. This improves the detection accuracy of a user operation on the projection device 40.

Second Embodiment

In the above-described the first embodiment, the vertex coordinates of the button image when the center of gravity of the button image is superimposed onto the center of gravity of the image-capturing area are obtained, thereby determining the position of the button image in the projected image. In a second embodiment, the following describes determination of the position of the button image in the projected image when the size of the button image is larger than the image-capturing area.

Configuration of Device According to Second Embodiment

Figure 5:
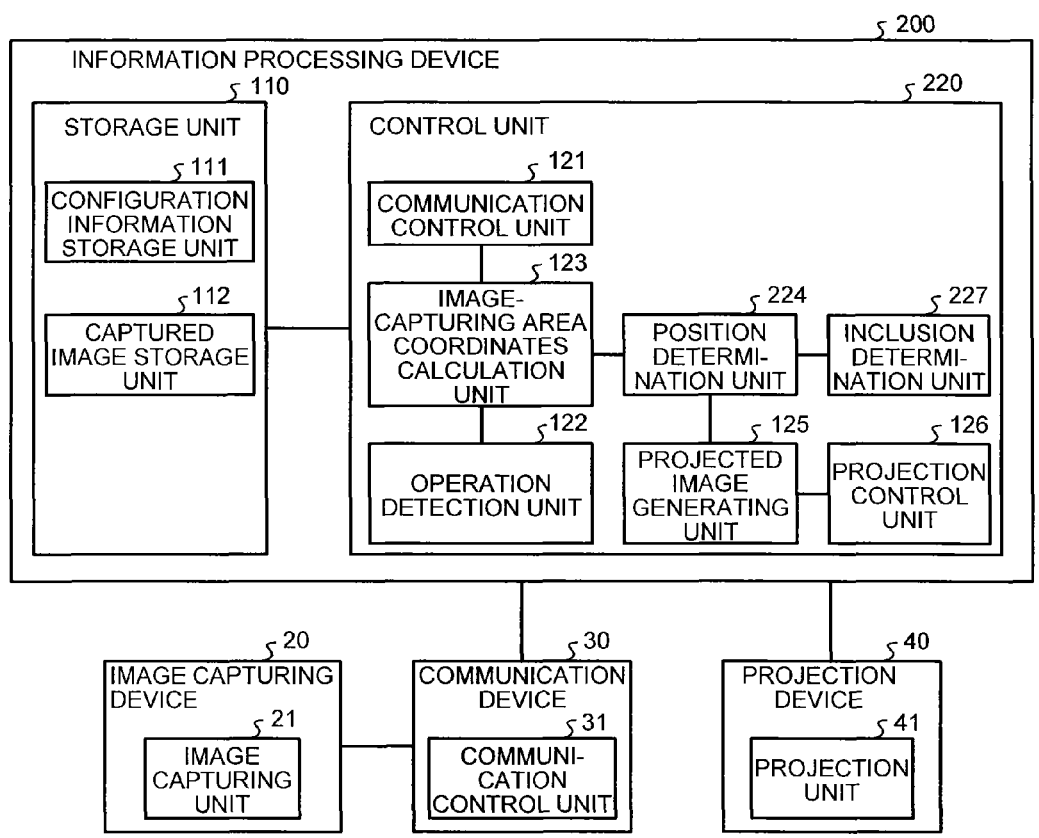
FIG. 5 is a functional block diagram illustrating a configuration example of a device according to a second embodiment of the present invention.

The following describes a configuration of a device according to the second embodiment with reference to FIG. 5. FIG. 5 is a functional block diagram illustrating a configuration example of the device according to the second embodiment. In the second embodiment, common numerals are assigned to similar components to the first embodiment, and overlapping explanation thereof may be omitted. Specifically, the functions, configurations, and processes for the components in the second embodiment are the same as those for the components in the first embodiment except for a position determination unit 224 and an inclusion determination unit 227 described below.

As illustrated in FIG. 5, the image capturing device 20 has the image capturing unit 21, the communication device 30 has the communication control unit 31, and the projection device 40 has the projection unit 41. An information processing device 200 has the storage unit 110 and a control unit 220, and the storage unit 110 has the configuration information storage unit 111 and the captured image storage unit 112. The control unit 220 has the communication control unit 121, the operation detection unit 122, the image-capturing area coordinates calculation unit 123, the position determination unit 224, the projected image generating unit 125, the projection control unit 126, and the inclusion determination unit 227.

The inclusion determination unit 227 determines whether the image-capturing area encompasses the operation target image. The position determination unit 224 determines the position of the operation target image to be laid out in the projected image when the size of the operation target image is reduced so as to be encompassed in the image-capturing area. More specifically, the position determination unit 224 calculates the width and the height of the image-capturing area based on the vertex coordinates of the image-capturing area calculated by the image-capturing area coordinates calculation unit 123. The position determination unit 224 then outputs the width and the height of the image-capturing area and the width and the height of the button image to the inclusion determination unit 227 and instructs the inclusion determination unit 227 to execute the inclusion determination process.

After the inclusion determination unit 227 receives the instruction of the inclusion determination process, the inclusion determination unit 227 determines whether the image-capturing area encompasses the button image based on the width and the height of the image-capturing area and the width and the height of the button image. In the inclusion determination process, the width and the height of the image-capturing area are compared to the width and the height of the button image, respectively, for example. The inclusion determination unit 227 then outputs the result of the inclusion determination process whether the image-capturing area encompasses the button image to the position determination unit 224.

If the inclusion determination unit 227 determines that the image-capturing area does not encompass the button image, the position determination unit 224 determines the position of the button image when the size of the button image is reduced according to the vertex coordinates of the image-capturing area. As an aspect of the embodiment, the size of the button image is reduced so that the original shape of the button image is maintained and reduced to the maximum size included in the image-capturing area, based on the vertex coordinates of the image-capturing area. This improves the operability of the user operation.

The vertex coordinates of the image-capturing area may be the same as the vertex coordinates of the button image, because the image-capturing area at least has to encompass the button image. Alternatively, any coordinates within the vertex coordinates of the image-capturing area may be determined as the vertex coordinates of the button image. That is, the position determination unit 224 calculates the vertex coordinates of the button image when the size of the button image is reduced so that the image-capturing area encompasses the button image, thereby determining the position of the button image in the projected image. If the inclusion determination unit 227 determines that the image-capturing area encompasses the button image, the same process is executed as the first embodiment.

Figure 6:
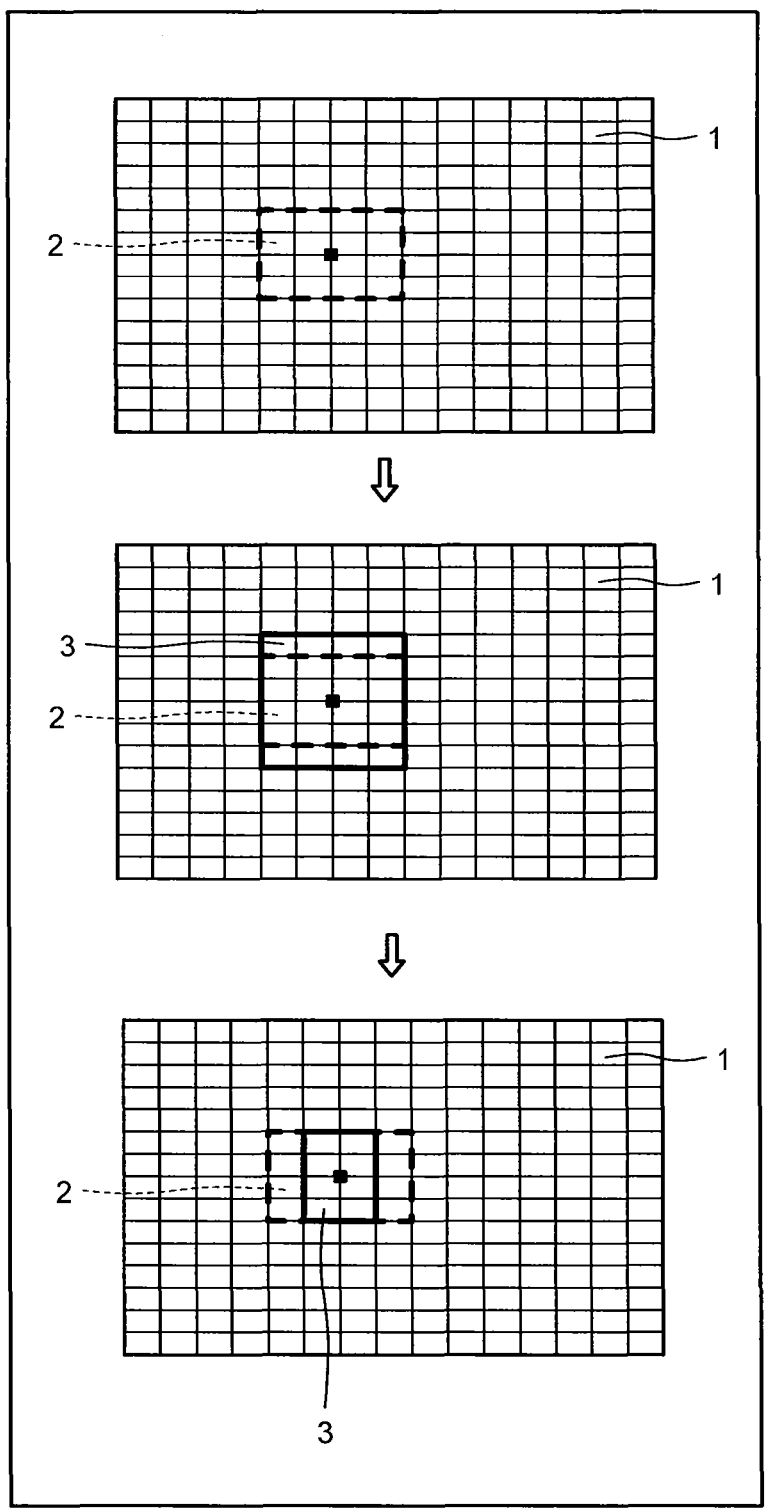
FIG. 6 is a diagram illustrating a layout example of a button image according to the second embodiment.

FIG. 6 is a diagram illustrating a layout example of the button image according to the second embodiment. In the example illustrated in the upper diagram in FIG. 6, the four vertex coordinates of the image-capturing area 2 indicate (4, 6), (4, 10), (8, 6), and (8, 10), respectively. The projected image 1 includes the image-capturing area 2 having the above-described vertex coordinates. In FIG. 6, the coordinates of the center of gravity of the image-capturing area 2 are represented with a black square. The size of the button image has a width of "4" and a height of "6".

In the above-described state, the position determination unit 224 calculates the width and the height of the image-capturing area 2 based on the vertex coordinates of the image-capturing area 2 and outputs the width and the height of the image-capturing area 2 and the width and the height of the button image to the inclusion determination unit 227. The inclusion determination unit 227 determines whether the image-capturing area 2 encompasses the button image based on the width and the height of the image-capturing area and the width and the height of the button image. As illustrated in the middle diagram in FIG. 6, the image-capturing area 2 does not encompass the button image 3. The inclusion determination unit 227 therefore determines that the image-capturing area 2 does not encompass the button image 3.

If the inclusion determination unit 227 determines that the image-capturing area 2 does not encompass the button image 3, the position determination unit 224 calculates the vertex coordinates of the button image 3 when the size of the button image 3 is reduced according to the vertex coordinates of the image-capturing area 2. As illustrated in the lower diagram in FIG. 6, the position determination unit 224 reduces the size of the button image 3 so that the image-capturing area 2 encompasses the button image 3 without changing the ratio of the width and the height of the button image 3, i.e., "width:height=2:3". In the example illustrated in the lower diagram in FIG. 6, the four vertex coordinates of the button image 3 that has been reduced in size indicate (5, 6), (5, 10), (7, 6), and (7, 10), respectively.

Flow of Image Generating Process According to Second Embodiment

Figure 7:
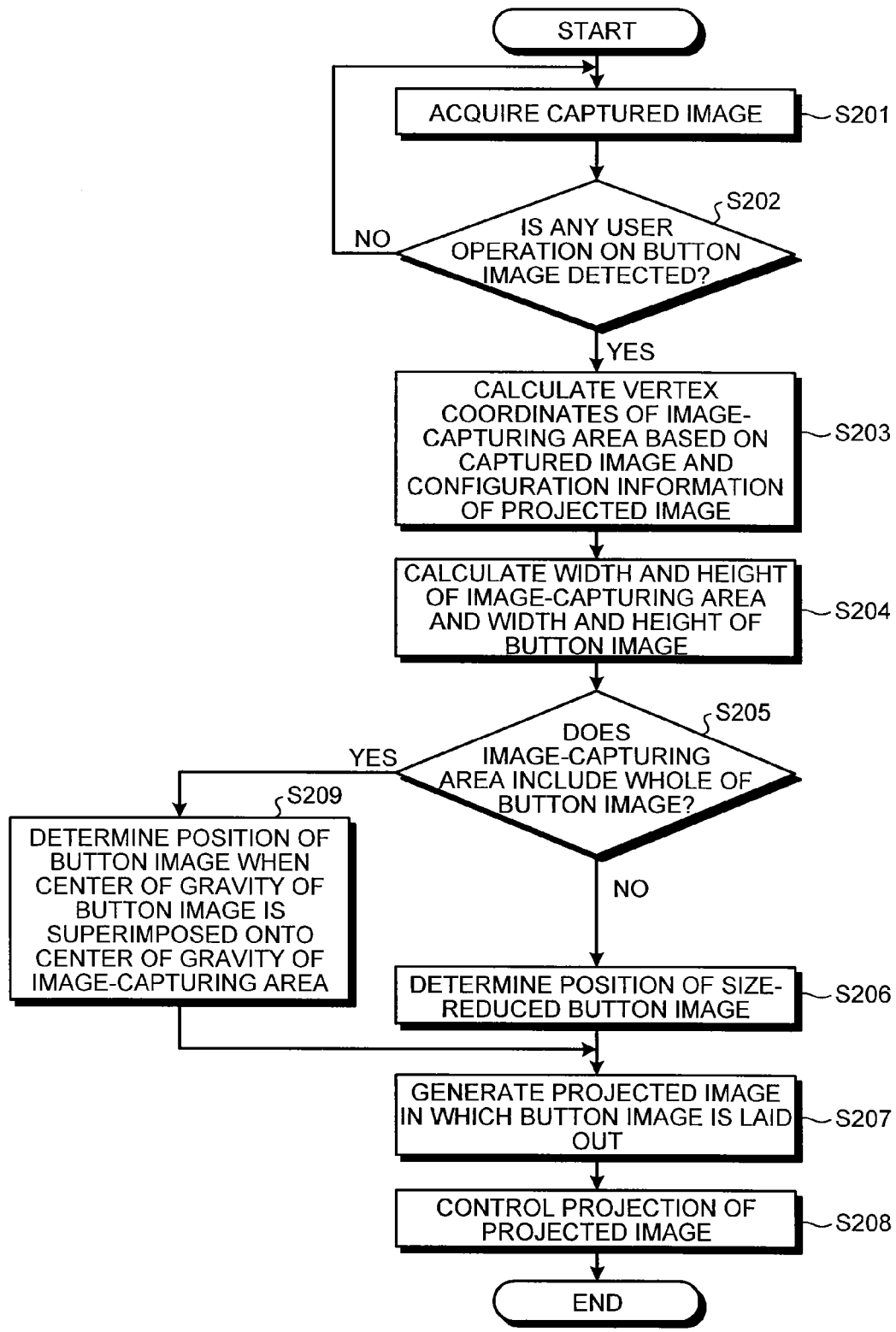
FIG. 7 is a flowchart illustrating a flow of an image generating process according to the second embodiment.

The following describes a flow of an image generating process according to the second embodiment with reference to FIG. 7. FIG. 7 is a flowchart illustrating a flow of the image generating process according to the second embodiment. In the example illustrated in FIG. 7, the image generating process is started triggered by detecting a user operation.

As illustrated in FIG. 7, the operation detection unit 122 acquires a captured image from the captured image storage unit 112 (Step S201). The operation detection unit 122 attempts to detect any user operation on the button image from the captured image (Step S202). If the operation detection unit 122 detects any user operation on the button image (Yes at Step S202), the image-capturing area coordinates calculation unit 123 calculates the vertex coordinates of the image-capturing area based on the captured image and the configuration information of the projected image stored in the configuration information storage unit 111 (Step S203). If the operation detection unit 122 detects no user operation on the button image (No at Step S202), the process at Step S101 is executed.

The position determination unit 224 calculates the width and the height of the image-capturing area based on the vertex coordinates of the image-capturing area and the width and the height of the button image based on the configuration information of the projected image (Step S204). The inclusion determination unit 227 compares the width and the height of the image-capturing area to the width and the height of the button image, thereby determining whether the image-capturing area encompasses the button image (Step S205).

If the inclusion determination unit 227 determines that the image-capturing area does not encompass the button image (No at Step S205), the position determination unit 224 calculates the vertex coordinates of the button image when the size of the button image is reduced so as to be encompassed in the image-capturing area according to the vertex coordinates of the image-capturing area, thereby determining the position of the button image in the image-capturing area when the size of the button image is reduced (Step S206). The projected image generating unit 125 generates the projected image in which the size-reduced button image is laid out based on the vertex coordinates of the size-reduced button image determined by the position determination unit 124 and the configuration information of the projected image (Step S207). After that, the projection control unit 126 controls the projection device 40 to project the projected image generated by the projected image generating unit 125 (Step S208).

If the inclusion determination unit 227 determines that the image-capturing area encompasses the button image (Yes at Step S205), the position determination unit 224 calculates the vertex coordinates of the button image when the center of gravity of the button image is superimposed onto the center of gravity of the image-capturing area, thereby determining the position of the button image in the projected image (Step S209). The projected image generating unit 125 generates the projected image in which the button image is laid out based on the vertex coordinates of the button image determined by the position determination unit 124 and the configuration information of the projected image (Step S207). After that, the projection control unit 126 controls the projection device 40 to project the projected image generated by the projected image generating unit 125 (Step S208).

Effects of Second Embodiment

The information processing device 200 determines whether the image-capturing area encompasses the button image and determines the position of the button image when the size of the button image is reduced so that the image-capturing area encompasses the button image, thereby generating the projected image in which the size-reduced button image is laid out on the determined position. As a result, the information processing device 200 can improve the operability of the user operation on the projected image and improve the detection accuracy of the user operation on the projection device 40.

Third Embodiment

In the above-described first and second embodiments, determination of the position of the button image in the projected image is described when a single button image is provided. In a third embodiment, the following describes determination of the positions of button images in the projected image when a plurality of button images is provided.

Configuration of Device According to Third Embodiment

Figure 8:
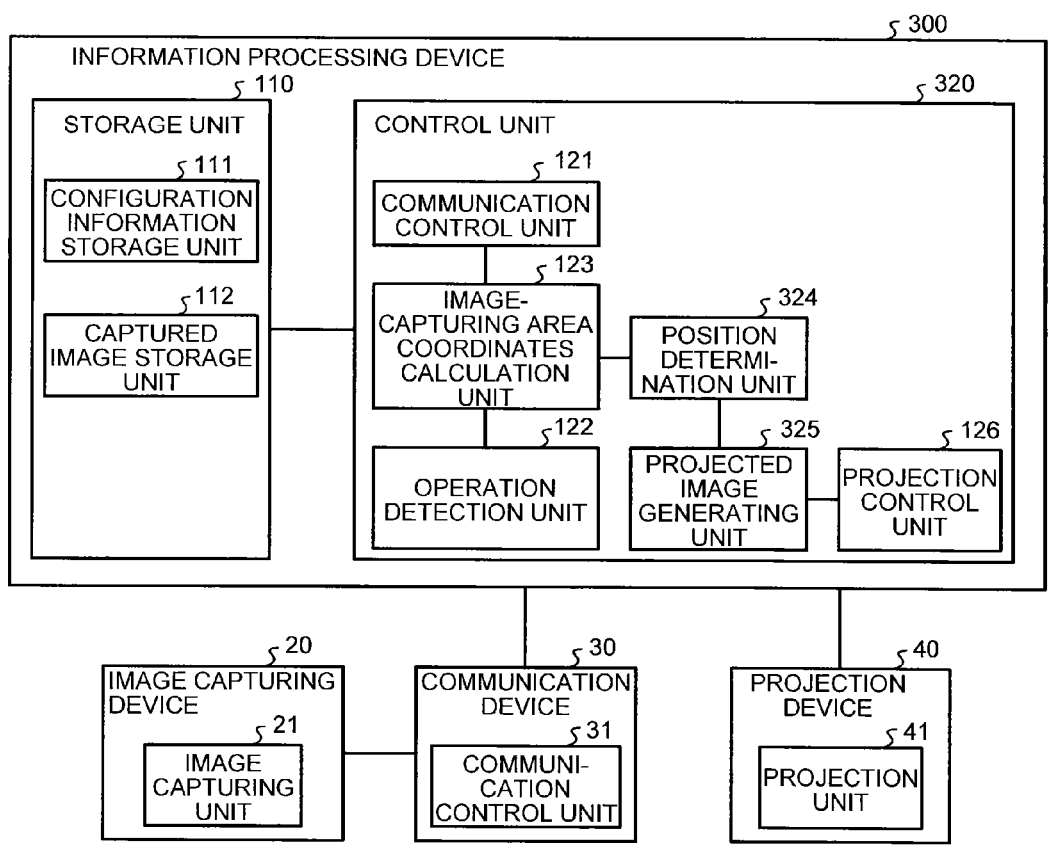
FIG. 8 is a functional block diagram illustrating a configuration example of a device according to a third embodiment of the present invention.

The following describes a configuration of a device according to the third embodiment with reference to FIG. 8. FIG. 8 is a functional block diagram illustrating a configuration example of the device according to the third embodiment. In the third embodiment, common numerals are assigned to similar components to the first embodiment, and overlapping explanation thereof may be omitted. Specifically, the functions, configurations, and processes for the components in the third embodiment are the same as those for the components in the first embodiment except for a position determination unit 324 and a projected image generating unit 325 described below.

As illustrated in FIG. 8, the image capturing device 20 has the image capturing unit 21, the communication device 30 has the communication control unit 31, and the projection device 40 has the projection unit 41. An information processing device 300 has the storage unit 110 and a control unit 320, and the storage unit 110 has the configuration information storage unit 111 and the captured image storage unit 112. The control unit 320 has the communication control unit 121, the operation detection unit 122, the image-capturing area coordinates calculation unit 123, the position determination unit 324, the projected image generating unit 325, and the projection control unit 126.

The position determination unit 324 determines the positions of the operation target images to be laid out in the projected image. More specifically, the position determination unit 324 determines the positions of the button images so as not to be superimposed onto each other based on predetermined vertex coordinates of the image-capturing area calculated by the image-capturing area coordinates calculation unit 123. For example, the predetermined vertex coordinates are the upper left vertex coordinates of the image-capturing area. That is, the position determination unit 324 calculates respective vertex coordinates of the button image when a plurality of button images are laid out one by one from the upper left vertex coordinates of the image-capturing area, thereby determining the positions of the button images. The above-described upper left vertex coordinates of the image-capturing area are provided merely for exemplary purpose and any other vertex coordinates of the image-capturing area can be used for determining the positions of the button images, i.e., the lower left vertex, the lower right vertex, or the upper right vertex of the image-capturing area. The vertex coordinates are used for determining the positions of the button images in order to efficiently lay out button images as many as possible.

The projected image generating unit 325 generates a projected image in which the operation target images are laid out. More specifically, the projected image generating unit 325 generates the projected image in which the button images are laid out based on the vertex coordinates of the button images determined by the position determination unit 324 and the configuration information of the projected image stored in the configuration information storage unit 111.

Figure 9:
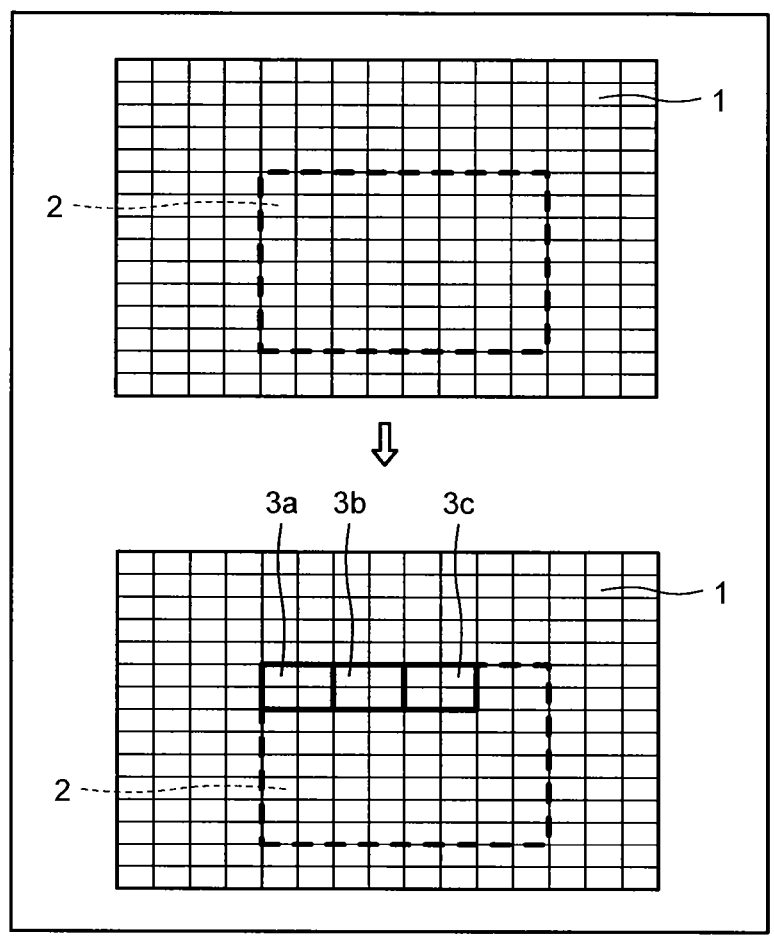
FIG. 9 is a diagram illustrating a layout example of button images according to the third embodiment.

FIG. 9 is a diagram illustrating a layout example of the button images according to the third embodiment. In the example illustrated in the upper diagram in FIG. 9, the four vertex coordinates of the image-capturing area 2 indicate (4, 2), (4, 10), (12, 2), and (12, 10), respectively. The projected image 1 includes the image-capturing area 2 having the above-described vertex coordinates. Three button images are used in the third embodiment, namely a button image 3a, a button image 3b, and a button image 3c, each having a width of "2" and a height of "2".

In the above-described state, the position determination unit 324 calculates the four vertex coordinates of the button image 3a, (4, 8), (4, 10), (6, 8), and (6, 10) when the upper left vertex of the button image 3a is superimposed onto the upper left vertex of the image-capturing area 2 (the vertex coordinates indicate (4, 10)). The position determination unit 324 then calculates the four vertex coordinates of the button image 3b (6, 8), (6, 10), (8, 8), and (8, 10) when the upper left vertex of the button image 3b is superimposed onto the upper right vertex of the button image 3a (the vertex coordinates indicate (6, 10)). The position determination unit 324 subsequently calculates the four vertex coordinates of the button image 3c (8, 8), (8, 10), (10, 8), and (10, 10) when the upper left vertex of the button image 3c is superimposed onto the upper right vertex of the button image 3b (the vertex coordinates indicate (8, 10)).

The projected image generating unit 325 generates a projected image 1 in which the button image 3a, the button image 3b, and the button image 3c are laid out based on the respective vertex coordinates of the button image 3a, the button image 3b, and the button image 3c determined by the position determination unit 324, and the configuration information of the projected image 1. As a result, as illustrated in the lower diagram in FIG. 9, the projected image 1 is generated in which the button image 3a, the button image 3b, and the button image 3c are laid out one by one from the upper left vertex coordinates of the image-capturing area 2 coordinates.

If the total width of the button images is longer than the width of the image-capturing area, some of the button images are sent to the next line in the image-capturing area. In the example illustrated in the upper diagram in FIG. 9, subsequent button images are laid out from the lower left vertex coordinates of the button image 3a (4, 8) in the second line in the image-capturing area. The order of layout of the button images may be determined according to the size of the button image if the sizes of the button images are different from each other. For example, the button images are laid out in the order from the bigger size to the smaller size of the button image.

Flow of Image Generating Process According to Third Embodiment

Figure 10:
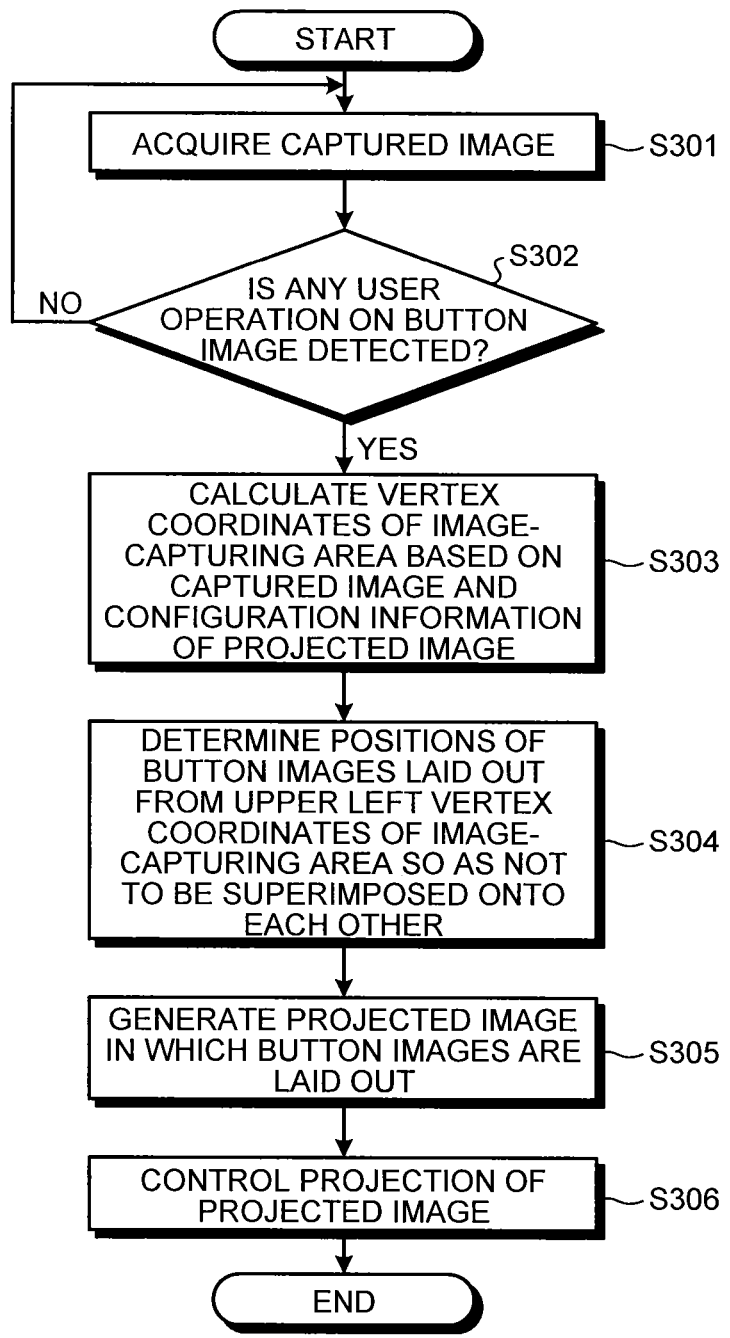
FIG. 10 is a flowchart illustrating a flow of an image generating process according to the third embodiment.

The following describes a flow of an image generating process according to the third embodiment with reference to FIG. 10. FIG. 10 is a flowchart illustrating a flow of the image generating process according to the third embodiment. In the example illustrated in FIG. 10, the image generating process is started triggered by detecting a user operation.

As illustrated in FIG. 10, the operation detection unit 122 acquires a captured image from the captured image storage unit 112 (Step S301). The operation detection unit 122 attempts to detect any user operation on the button image from the captured image (Step S302). If the operation detection unit 122 detects any user operation on the button image (Yes at Step S302), the image-capturing area coordinates calculation unit 123 calculates the vertex coordinates of the image-capturing area based on the captured image and the configuration information of the projected image stored in the configuration information storage unit 111 (Step S303). If the operation detection unit 122 detects no user operation on the button image (No at Step S302), the process at Step S301 is executed.

The position determination unit 324 calculates the respective vertex coordinates of the button images when the button images are laid out one by one from the upper left vertex coordinates of the image-capturing area so as not to be superimposed onto each other, based on the respective height and width of the vertex coordinates and button images in the image-capturing area. This determines the positions of the button images in the projected image (Step S304). The projected image generating unit 325 generates the projected image in which the button images are laid out based on the vertex coordinates of the button images determined by the position determination unit 324 and the configuration information of the projected image (Step S305). After that, the projection control unit 126 controls the projection device 40 to project the projected image generated by the projected image generating unit 325 (Step S306).

Effects of Third Embodiment

The information processing device 300 determines the positions of the button images so as not to be superimposed onto each other starting from certain coordinates such as the upper left vertex coordinates of the image-capturing area. The information processing device 300 then generates a projected image in which the button images are laid out on the determined positions. As a result, the information processing device 300 can improve the detection accuracy of the user operation on the projection device 40.

Fourth Embodiment

In the above-described the third embodiment, a plurality of button images are laid out so as not to be superimposed onto each other based on certain vertex coordinates of the image-capturing area. In a fourth embodiment, the following describes the determination of the positions of the button images in the projected image when the image-capturing area does not encompass the button images.

Configuration of Device According to Fourth Embodiment

Figure 11:
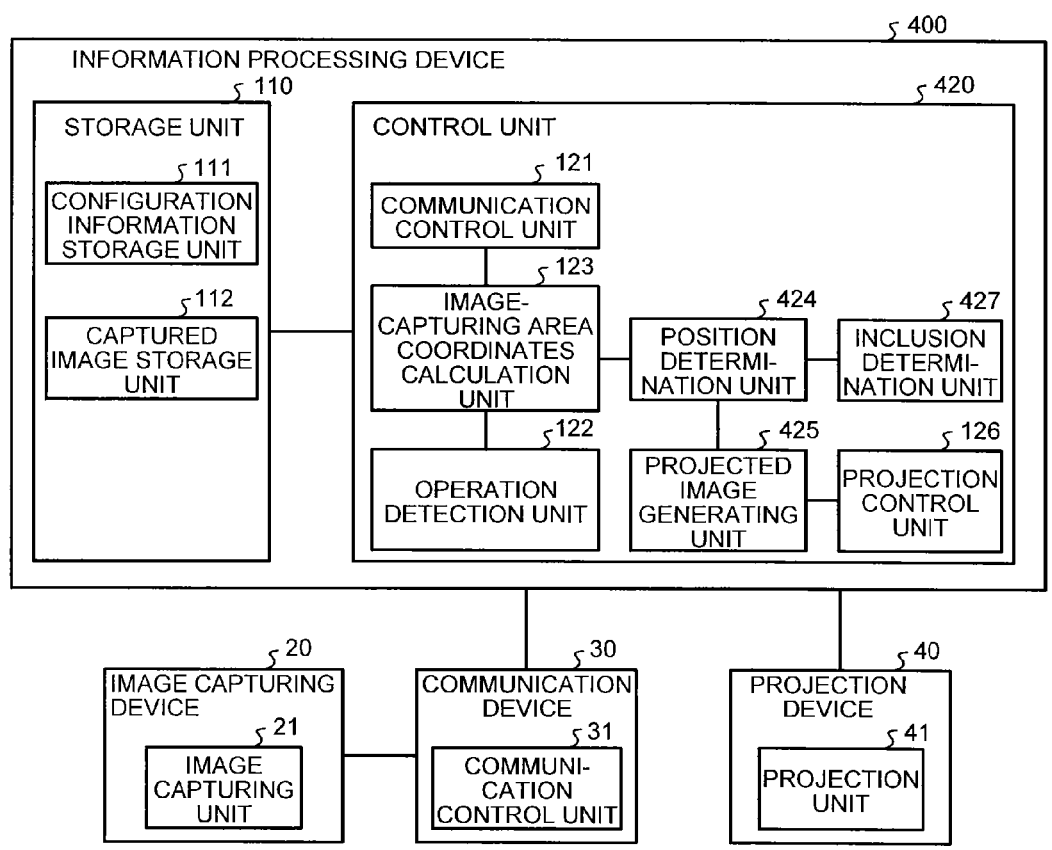
FIG. 11 is a functional block diagram illustrating a configuration example of a device according to a fourth embodiment of the present invention.

The following describes a configuration of a device according to the fourth embodiment with reference to FIG. 11. FIG. 11 is a functional block diagram illustrating a configuration example of the device according to the fourth embodiment. In the fourth embodiment, common numerals are assigned to similar components to the first embodiment, and overlapping explanation thereof may be omitted. Specifically, the functions, configurations, and processes for the components in the fourth embodiment are the same as those for the components in the first embodiment except for a position determination unit 424, a projected image generating unit 425, and an inclusion determination unit 427 described below.

As illustrated in FIG. 11, the image capturing device 20 has the image capturing unit 21, the communication device 30 has the communication control unit 31, and the projection device 40 has the projection unit 41. An information processing device 400 has the storage unit 110 and a control unit 420, and the storage unit 110 has the configuration information storage unit 111 and the captured image storage unit 112. The control unit 420 has the communication control unit 121, the operation detection unit 122, the image-capturing area coordinates calculation unit 123, the position determination unit 424, the projected image generating unit 425, the projection control unit 126, and the inclusion determination unit 427.

The inclusion determination unit 427 determines whether the image-capturing area encompasses the operation target images. The position determination unit 424 determines the positions of the operation target images to be laid out in the projected image when the sizes of the operation target images are reduced so as to be encompassed in the image-capturing area. More specifically, the position determination unit 424 calculates the vertex coordinates of the button images when the button images are laid out one by one from the upper left vertex coordinates out of the vertex coordinates of the image-capturing area calculated by the image-capturing area coordinates calculation unit 123 so as not to be superimposed onto each other, in the same manner as the third embodiment. The position determination unit 424 then outputs the vertex coordinates of the image-capturing area and the respective vertex coordinates of the button images to the inclusion determination unit 427 and instructs the inclusion determination unit 427 to execute the inclusion determination process.

After the inclusion determination unit 427 receives the instruction of the inclusion determination process, the inclusion determination unit 427 determines whether the image-capturing area encompasses the button images based on the vertex coordinates of the image-capturing area and the respective vertex coordinates of the button images. For example, in the inclusion determination process, if any one of the vertex coordinates of the button images exists outside of the vertex coordinates of the image-capturing area, the inclusion determination unit 427 determines that the image-capturing area does not encompass the button images. The inclusion determination unit 427 then outputs the results of the inclusion determination process whether the image-capturing area encompasses the button images to the position determination unit 424.

This enables the position determination unit 424 to determine the positions of the button images when the sizes of the button images are reduced so as to be encompassed in the image-capturing area if the inclusion determination unit 427 determines that the image-capturing area does not encompass the button images. The sizes of the button images are reduced so that the original shapes of the button images are maintained and reduced to the maximum sizes included in the image-capturing area, based on the vertex coordinates of the image-capturing area.

The vertex coordinates of the button images may be obtained by dividing the image-capturing area by the number of button images, because the image-capturing area at least has to encompass the button images. That is, the position determination unit 424 calculates the vertex coordinates of the button images when the sizes of the button images are reduced so that the image-capturing area encompasses the button images, thereby determining the positions of the size-reduced button images in the projected image. If the inclusion determination unit 427 determines that the image-capturing area encompasses the button images, the same process is executed as the third embodiment.

The projected image generating unit 425 generates a projected image in which the operation target images are laid out. More specifically, the projected image generating unit 425 generates the projected image in which the button images are laid out based on the vertex coordinates of the size-reduced button images determined by the position determination unit 424 and the configuration information of the projected image stored in the configuration information storage unit 111.

Figure 12:
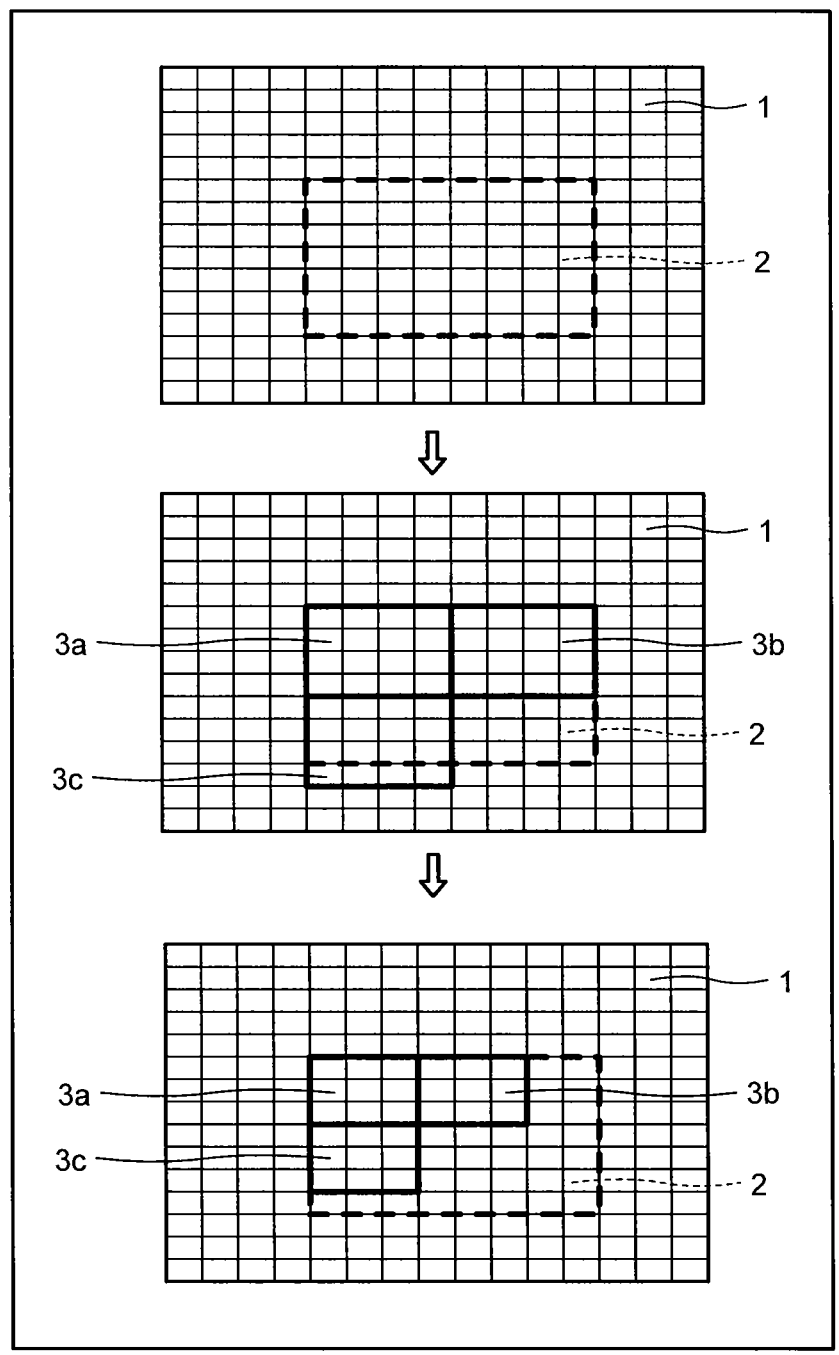
FIG. 12 is a diagram illustrating a layout example of button images according to the fourth embodiment.

FIG. 12 is a diagram illustrating a layout example of the button images according to the fourth embodiment. In the example illustrated in the upper diagram in FIG. 12, the four vertex coordinates of the image-capturing area 2 indicate (4, 3), (4, 10), (12, 3), and (12, 10), respectively. The projected image 1 includes the image-capturing area 2 having the above-described vertex coordinates. Three button images are used in the fourth embodiment, namely a button image 3a, a button image 3b, and a button image 3c, each having a width of "4" and a height of "4".

In the above-described state, the position determination unit 424 calculates the four vertex coordinates of the button image 3a, (4, 6), (4, 10), (8, 6), and (8, 10) when the upper left vertex of the button image 3a is superimposed onto the upper left vertex of the image-capturing area 2 (the vertex coordinates indicate (4, 10)). The position determination unit 424 then calculates the four vertex coordinates of the button image 3b, (8, 6), (8, 10), (12, 6), and (12, 10) when the upper left vertex of the button image 3b is superimposed onto the upper right vertex of the button image 3b (the vertex coordinates indicate (8, 10)). On this occasion, because the total width of the button image 3*a* and the button image 3*b* reaches the width of the image-capturing area 2, the position determination unit 424 lays out the button image 3*c* from the lower left vertex coordinates (4, 6) of the button image 3*a*. That is, the position determination unit 424 calculates the vertex coordinates of the button image 3*c*, (4, 2), (4, 6), (8, 2), and (8, 6) when the upper left vertex of the button image 3*c* is superimposed onto the lower left vertex of the button image 3*a* (the vertex coordinates indicate (4, 6)). After that, the position determination unit 424 outputs the vertex coordinates of the image-capturing area 2, the vertex coordinates of the button image 3*a*, the vertex coordinates of the button image 3*b*, and the vertex coordinates of the button image 3*c* to the inclusion determination unit 427.

The inclusion determination unit 427 determines whether any one of the vertex coordinates of the button images exists outside of the vertex coordinates of the image-capturing area based on the vertex coordinates of the image-capturing area 2 and the vertex coordinates of the button images 3*a*, 3*b*, and 3*c*, thereby determining whether the image-capturing area 2 encompasses the button images. On this occasion, as illustrated in the middle diagram in FIG. 12, the image-capturing area 2 does not encompass the button image 3*c*. The inclusion determination unit 427 thus determines that the image-capturing area 2 does not encompass the button images.

If the inclusion determination unit 427 determines that the image-capturing area 2 does not encompass the button images, the position determination unit 424 determines the positions of the button images when the sizes of the button images are reduced according to the vertex coordinates of the image-capturing area 2. The position determination unit 424 reduces the sizes of the button images so that the image-capturing area 2 includes the button images without changing the respective ratios of the width and the height of the button images, i.e., "width:height=1:1" of the button images 3*a*, 3*b*, and 3*c*. In the example illustrated in the upper diagram in FIG. 12, the four vertex coordinates of the button image 3*a* that has been reduced in size indicate (4, 7), (4, 10), (7, 7), and (7, 10), respectively. The four vertex coordinates of the button image 3*b* that has been reduced in size indicate (7, 7), (7, 10), (10, 7), and (10, 10), respectively and the four vertex coordinates of the button image 3*c* that has been reduced in size indicate (4, 4), (4, 7), (7, 4), and (7, 7), respectively.

The projected image generating unit 425 generates a projected image 1 in which the button image 3*a*, the button image 3*b*, and the button image 3*c* that have been reduced in size are laid out based on the respective vertex coordinates of the button image 3*a*, the button image 3*b*, and the button image 3*c* that have been reduced in size and determined by the position determination unit 424, and the configuration information of the projected image 1. As a result, as illustrated in the lower diagram in FIG. 12, the projected image 1 is generated in which the button image 3*a*, the button image 3*b*, and the button image 3*c* are laid out one by one from the upper left vertex coordinates of the image-capturing area 2.

Flow of Image Generating Process According to Fourth Embodiment

Figure 13:
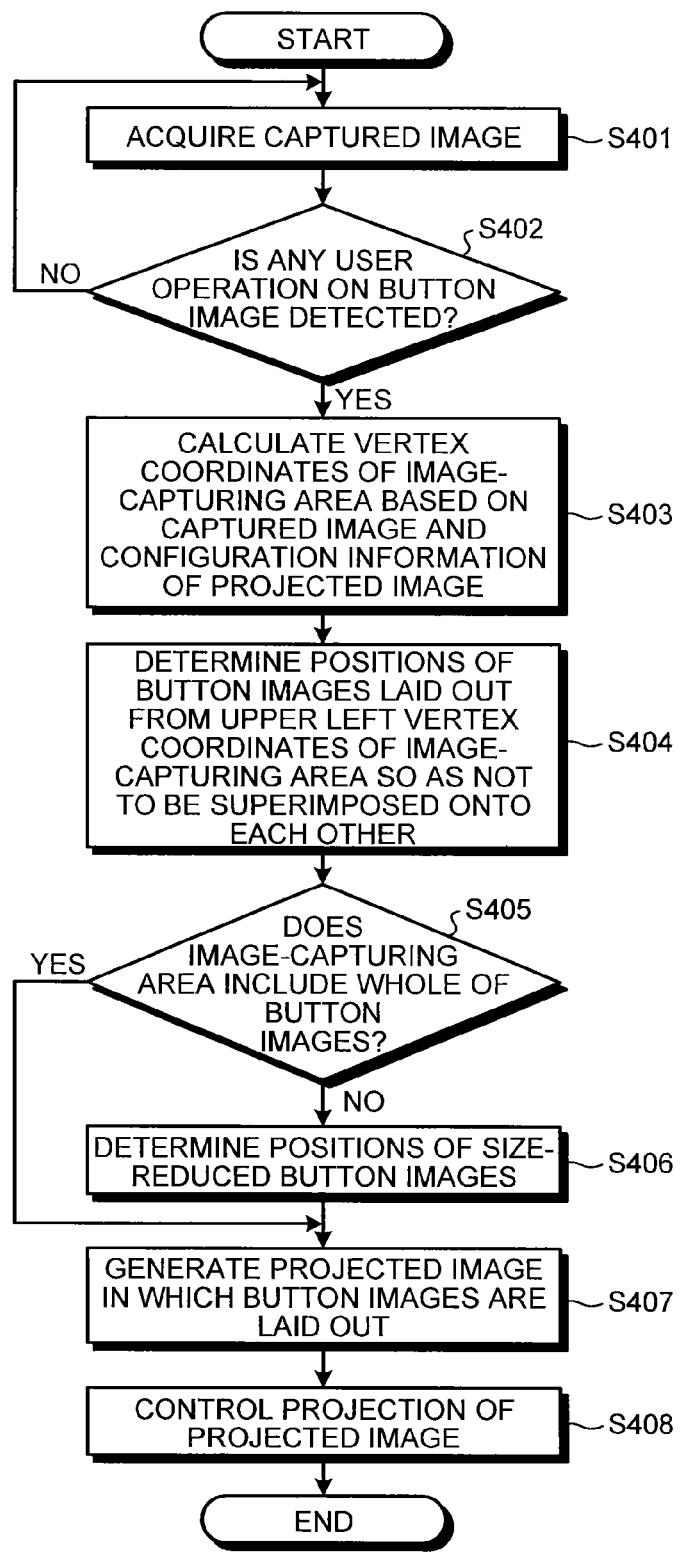
FIG. 13 is a flowchart illustrating a flow of an image generating process according to the fourth embodiment.

The following describes a flow of an image generating process according to the fourth embodiment with reference to FIG. 13. FIG. 13 is a flowchart illustrating a flow of the image generating process according to the fourth embodiment. In the example illustrated in FIG. 13, the image generating process is started triggered by detecting a user operation.

As illustrated in FIG. 13, the operation detection unit 122 acquires a captured image from the captured image storage unit 112 (Step S401). The operation detection unit 122 attempts to detect any user operation on the button image from the captured image (Step S402). If the operation detection unit 122 detects any user operation on the button image (Yes at Step S402), the image-capturing area coordinates calculation unit 123 calculates the vertex coordinates of the image-capturing area based on the captured image and the configuration information of the projected image stored in the configuration information storage unit 111 (Step S403). If the operation detection unit 122 detects no user operation on the button image (No at Step S402), the process at Step S401 is executed.

The position determination unit 424 calculates the respective vertex coordinates of the button images when the button images are laid out one by one from the upper left vertex coordinates of the image-capturing area so as not to be superimposed onto each other, based on the respective height and width of the vertex coordinates and button images in the image-capturing area. This determines the positions of the button images in the projected image (Step S404). On this occasion, the position determination unit 424 outputs the vertex coordinates of the image-capturing area and the calculated vertex coordinates of the button images to the inclusion determination unit 427. This enables the inclusion determination unit 427 to determine whether the image-capturing area encompasses the button images (Step S405).

If the inclusion determination unit 427 determines that the image-capturing area does not encompass the button images (No at Step S405), the position determination unit 424 calculates the vertex coordinates of the button images when the sizes of the button images are reduced so as to be encompassed in the image-capturing area according to the vertex coordinates of the image-capturing area, thereby determining the positions of the button images in the image-capturing area when the sizes of the button images are reduced (Step S406). The projected image generating unit 425 generates a projected image in which the size-reduced button images are laid out based on the vertex coordinates of the size-reduced button image determined by the position determination unit 424 and the configuration information of the projected image (Step S407). After that, the projection control unit 126 controls the projection device 40 to project the projected image generated by the projected image generating unit 425 (Step S408).

If the inclusion determination unit 427 determines that the image-capturing area encompasses the button images (Yes at Step S405), the projected image generating unit 425 generates a projected image in which the button images are laid out based on the vertex coordinates of the button images determined by the position determination unit 424 and the configuration information of the projected image (Step S407). After that, the projection control unit 126 controls the projection device 40 to project the projected image generated by the projected image generating unit 425 (Step S408).

Effects of Fourth Embodiment

The information processing device 400 determines whether the image-capturing area encompasses the button images and determines the positions of the button images when the sizes of the button images are reduced so that the image-capturing area encompasses the button image, thereby generating the projected image in which the button images are laid out on the determined position. As a result, the information processing device 400 can improve detection accuracy of a user operation on the projection device 40.

Fifth Embodiment

In the above-described the fourth embodiment, generation of the projected image is described, in which the button images are laid out so as to be encompassed in the image-capturing area. In a fifth embodiment, the following describes layout of an object for switching display of button images in the image-capturing area.

Configuration of Device According to Fifth Embodiment

Figure 14:
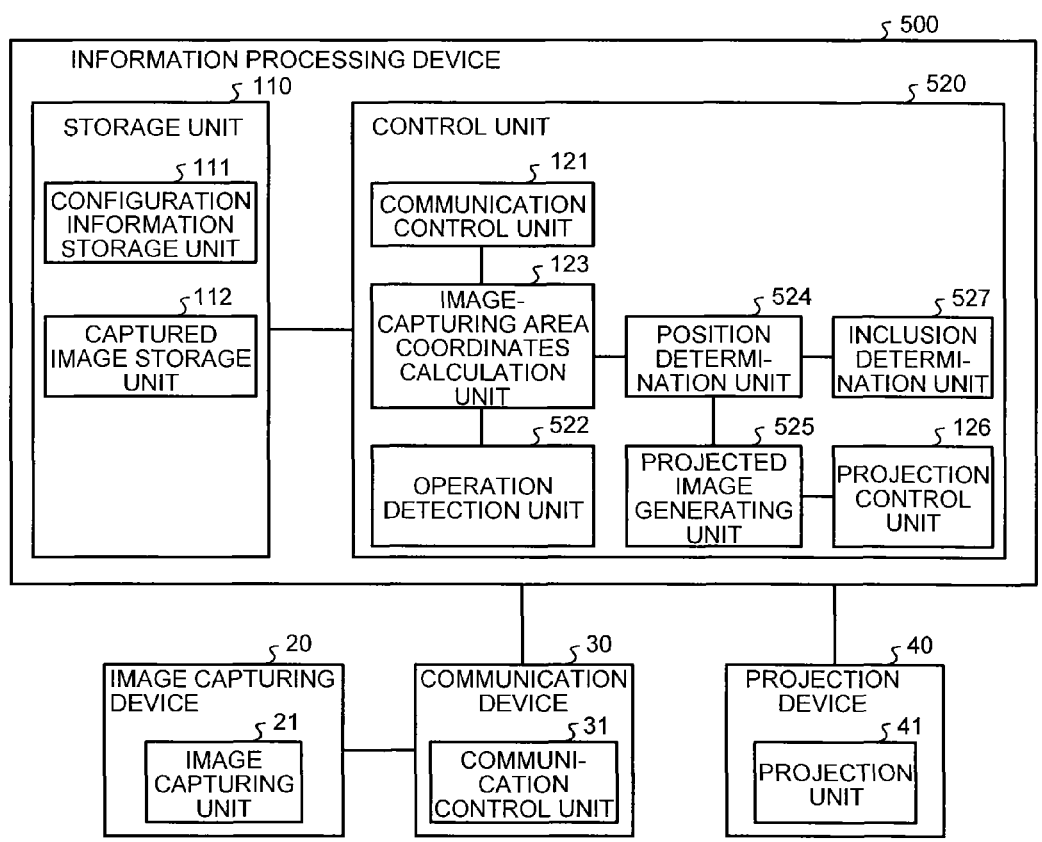
FIG. 14 is a functional block diagram illustrating a configuration example of a device according to a fifth embodiment of the present invention.

The following describes a configuration of a device according to the fifth embodiment with reference to FIG. 14. FIG. 14 is a functional block diagram illustrating a configuration example of a device according to the fifth embodiment. In the fifth embodiment, common numerals are assigned to similar components to the first embodiment, and overlapping explanation thereof may be omitted. Specifically, the functions, configurations, and processes for the components in the fifth embodiment are the same as those for the components in the first embodiment except for an operation detection unit 522, a position determination unit 524, a projected image generating unit 525, and an inclusion determination unit 527 described below.

As illustrated in FIG. 14, the image capturing device 20 has the image capturing unit 21, the communication device 30 has the communication control unit 31, and the projection device 40 has the projection unit 41. An information processing device 500 has the storage unit 110 and a control unit 520, and the storage unit 110 has the configuration information storage unit 111 and the captured image storage unit 112. The control unit 520 has the communication control unit 121, the operation detection unit 522, the image-capturing area coordinates calculation unit 123, the position determination unit 524, the projected image generating unit 525, the projection control unit 126, and the inclusion determination unit 527.

The inclusion determination unit 527 determines whether the image-capturing area encompasses operation target images. The position determination unit 524 determines the position of a display switching screen for switching display of the operation target images. More specifically, the position determination unit 524 calculates the vertex coordinates of the button images when the button images are laid out one by one from the upper left vertex coordinates out of the vertex coordinates of the image-capturing area calculated by the image-capturing area coordinates calculation unit 123 so as not to be superimposed onto each other, in the same manner as the fourth embodiment. The position determination unit 524 then outputs the vertex coordinates of the image-capturing area and the vertex coordinates of the button image to the inclusion determination unit 527 and instructs the inclusion determination unit 527 to execute the inclusion determination process.

After the inclusion determination unit 527 receives the instruction of the inclusion determination process, the inclusion determination unit 527 determines whether the image-capturing area encompasses the button images based on the vertex coordinates of the image-capturing area and the vertex coordinates of the button images. For example, in the inclusion determination process, if any one of the vertex coordinates of the button images exists outside of the vertex coordinates of the image-capturing area, the inclusion determination unit 527 determines that the image-capturing area does not encompass the button images. The inclusion determination unit 527 then outputs the result of the inclusion determination process whether the image-capturing area encompasses the button images to the position determination unit 524.

This enables the position determination unit 524 to determine the position of the display switching screen for switching display of the button images so as to be encompassed in the image-capturing area if the inclusion determination unit 527 determines that the image-capturing area does not encompass the button images. The display switching screen is achieved by using a combo box, for example. When using such a combo box, the image-capturing area needs to encompass the display expanded with selected target items when selecting any one of the button image. For example, if three button images exist, the position determination unit 524 calculates the vertex coordinates of the display switching screen so that the image-capturing area encompasses the necessary height, at least a height of "4" in consideration of expanding the four selected target items, according to the vertex coordinates of the image-capturing area. This enables the user to switch the button images by using the combo box. Any object can be used for the display switching screen rather than the combo box, as long as the object has a selecting function such as a select box. In the present embodiment, using such a display switching screen can select any one of the button images through the user operation, thereby generating the projected image in which the selected button image is laid out in the image-capturing area.

The projected image generating unit 525 generates a projected image in which the display switching screen is laid out. More specifically, the projected image generating unit 525 generates a projected image in which the display switching screen is provided based on the vertex coordinates of the display switching screen determined by the position determination unit 524 and the configuration information of the projected image stored in the configuration information storage unit 111.

If a user operation is performed on the projected image in which the display switching screen generated by the projected image generating unit 525 is provided, the operation detection unit 522 detects any user operation on the display switching screen by using the captured image. After that, the position determination unit 524 determines the position of a single button image selected by the user operation, and the projected image generating unit 525 generates a projected image in which the button image of which position has been determined is provided. When the position of the button image is determined, the inclusion determination process may be executed by the inclusion determination unit 527.

Figure 15:
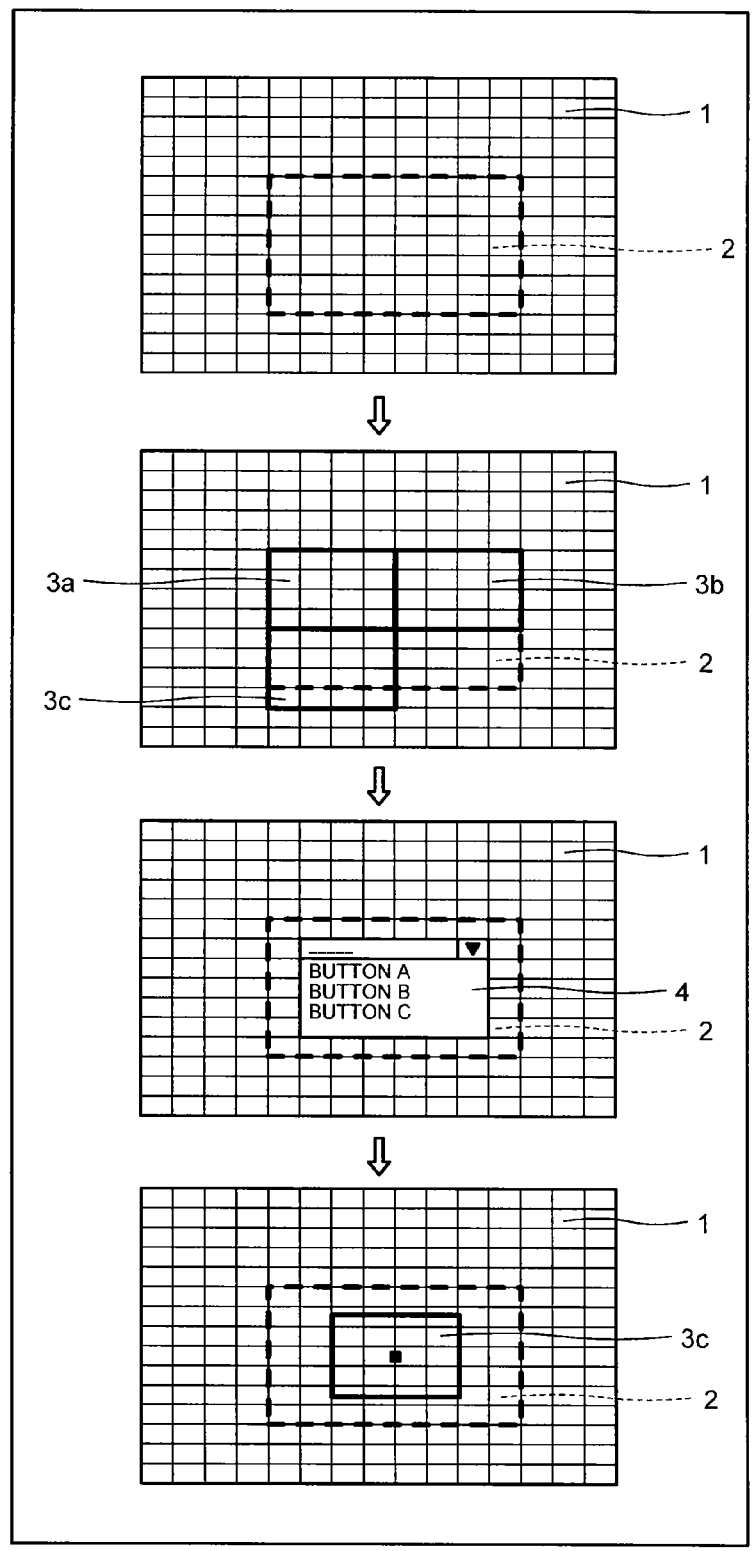
FIG. 15 is a diagram illustrating a layout example of a combo box and button images according to the fifth embodiment.

FIG. 15 is a diagram illustrating a layout example of a combo box and button images according to the fifth embodiment. In the example illustrated in the upper diagram in FIG. 15, the four vertex coordinates of the image-capturing area 2 indicate (4, 3), (4, 10), (12, 3), and (12, 10), respectively. The projected image 1 includes the image-capturing area 2 having the above-described vertex coordinates. Three button images are used in the fifth embodiment, namely a button image 3a, a button image 3b, and a button image 3c, each having a width of "4" and a height of "4".

In the above-described state, the position determination unit 524 calculates the four vertex coordinates of the button image 3a, (4, 6), (4, 10), (8, 6), and (8, 10) when the upper left vertex of the button image 3a is superimposed onto the upper left vertex of the image-capturing area 2 (the vertex coordinates indicate (4, 10)). The position determination unit 524 then calculates the four vertex coordinates of the button image 3b, (8, 6), (8, 10), (12, 6), and (12, 10) when the upper left vertex of the button image 3b is superimposed onto the upper right vertex of the button image 3a (the vertex coordinates indicate (8, 10)). On this occasion, because the total width of the button image 3a and the button image 3b reaches the width of the image-capturing area 2, the position determination unit 524 lays out the button image 3c from the lower left vertex coordinates (4, 6) of the button image 3a. That is, the position determination unit 524 calculates the vertex coordinates of the button image 3c, (4, 2), (4, 6), (8, 2), and (8, 6) when the upper left vertex of the button image 3c is superimposed onto the lower left vertex of the button image 3a (the vertex coordinates indicate (4, 6)). After that, the position determination unit 524 outputs the vertex coordinates of the image-capturing area 2, the vertex coordinates of the button image 3a, the vertex coordinates of the button image 3b, and the vertex coordinates of the button image 3c to the inclusion determination unit 527.

The inclusion determination unit 527 determines whether any one of the vertex coordinates of the button images exists outside of the vertex coordinates of the image-capturing area 2 based on the vertex coordinates of the image-capturing area 2 and the vertex coordinates of the button images 3a, 3b, and 3c, thereby determining whether the image-capturing area 2 encompasses the button images. On this occasion, as illustrated in the upper middle diagram (the second from the top) in FIG. 15, the image-capturing area 2 does not encompass the button image 3c. The inclusion determination unit 527 thus determines that the image-capturing area 2 does not encompass the button images.

If the inclusion determination unit 527 determines that the image-capturing area 2 does not encompass the button images, the position determination unit 524 determines the position of the combo box for switching display of the three button images so as to be encompassed in the image-capturing area 2 based on the width "8" and the height "7" obtained from the vertex coordinates of the image-capturing area 2. The height of the combo box is determined so as to be included in the width "8" of the image-capturing area 2. The width of the combo box is determined so as to be included in the height "7" of the image-capturing area 2. The number of selected target items is three, at least an area with a height of "4" is necessary. A combo box with an expanded display having a width of "6" and a height of "5" is employed. Accordingly, the position determination unit 524 calculates the four vertex coordinates (5, 4), (5, 9), (11, 4), and (11, 9) of the combo box when the center of gravity of the combo box is superimposed onto the center of gravity of the image-capturing area 2, thereby determining the position of the combo box.

The projected image generating unit 525 generates a projected image 1 in which the combo box is laid out based on the vertex coordinates of the combo box determined by the position determination unit 524, and the configuration information of the projected image 1. As a result, as illustrated in the lower middle diagram (the third from the top) in FIG. 15, the projected image 1 is generated in which the center of gravity of this combo box 4 when the four selected target items are expanded is superimposed onto the center of gravity of the image-capturing area 2. That is, the combo box 4 is laid out in the projected image 1 so that all of the selected target items can be expanded in consideration of the selection of any one of the selected target items through a user operation, although the selected target items are not expanded in the initial display of the combo box. In FIG. 15, the "button A" corresponds to the button image 3a, the "button B" corresponds to the button image 3b, and the "button C" corresponds to the button image 3c.

In the projected image 1 in which the combo box 4 is provided, the "button C" corresponding to the button image 3c is selected by a user operation. The operation detection unit 522 detects that the "button C" is selected in the combo box 4 by the user operation, by using the captured image. The position determination unit 524 calculates the vertex coordinates of the button image 3c when the center of gravity of the button image 3c is superimposed onto the center of gravity of the image-capturing area 2, thereby determining the position of the button image 3c. The four vertex coordinates of the button image 3c indicate (6, 4.5), (6, 8.5), (10, 4.5), and (10, 8.5), respectively. Because the inclusion determination process on the button image 3c executed by the inclusion determination unit 527 is the same as the inclusion determination process according to the second embodiment, overlapping explanation thereof is omitted.

After that, the projected image generating unit 525 generates a projected image 1 in which the button image 3c is laid out based on the vertex coordinates of the button image 3c determined by the position determination unit 524, and the configuration information of the projected image 1. As a result, as illustrated in the bottom diagram in FIG. 15, the projected image 1 is generated in which the center of gravity of the button image 3c having a width of "4" and a height of "4" is superimposed onto the coordinates (8, 6.5) of the center of gravity of the image-capturing area 2.

Flow of Image Generating Process According to Fifth Embodiment

Figure 16:
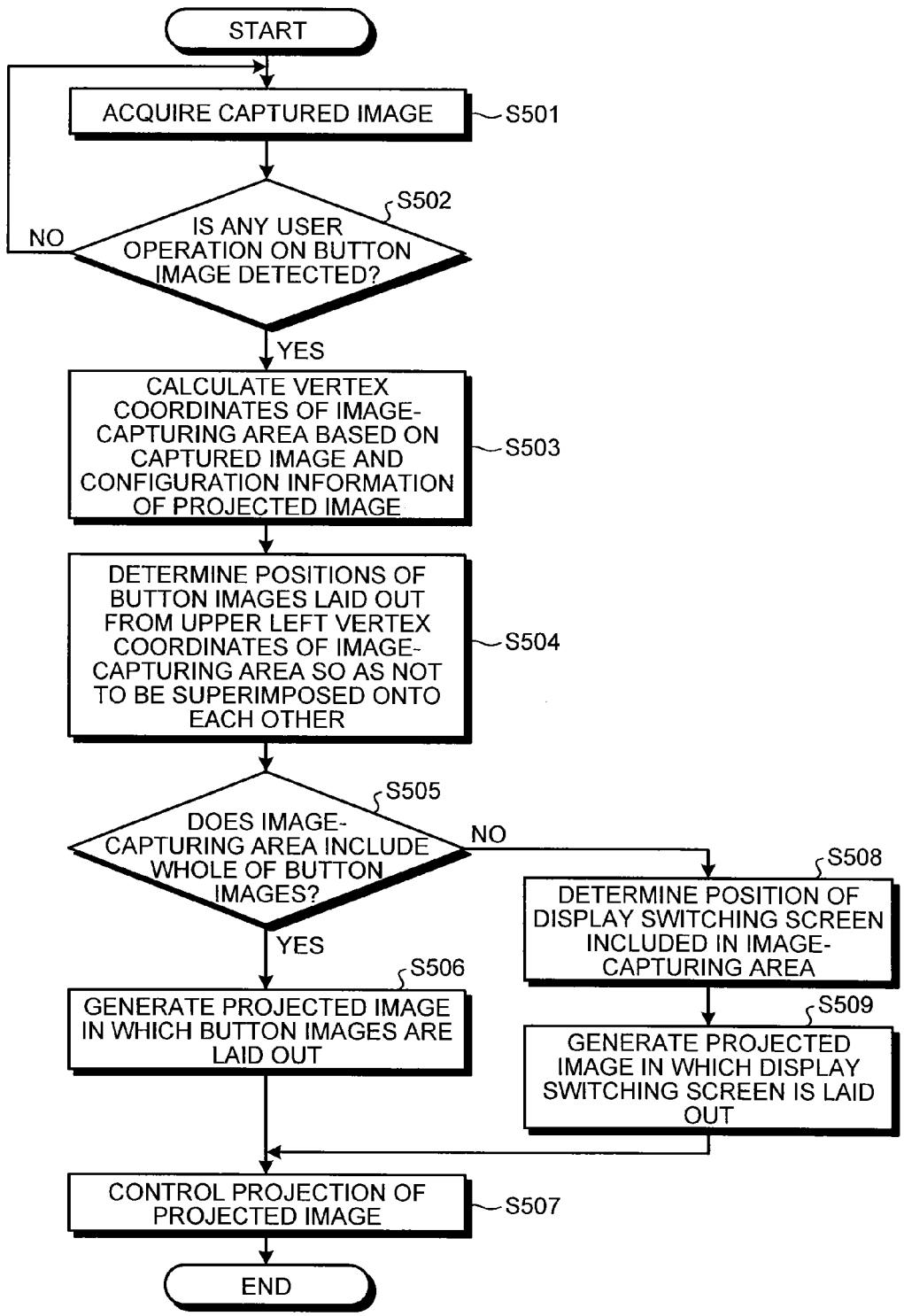
FIG. 16 is a flowchart illustrating a flow of an image generating process according to the fifth embodiment.

The following describes a flow of an image generating process according to the fifth embodiment with reference to FIG. 16. FIG. 16 is a flowchart illustrating a flow of the image generating process according to the fifth embodiment. In the example illustrated in FIG. 16, the image generating process is started triggered by detecting a user operation.

As illustrated in FIG. 16, the operation detection unit 522 acquires a captured image from the captured image storage unit 112 (Step S501). The operation detection unit 522 attempts to detect any user operation on the button image in the captured image (Step S502). If the operation detection unit 522 detects any user operation on the button image (Yes at Step S502), the image-capturing area coordinates calculation unit 123 calculates the vertex coordinates of the image-capturing area based on the captured image and the configuration information of the projected image stored in the configuration information storage unit 111 (Step S503). If the operation detection unit 522 detects no user operation on the button image (No at Step S502), the process at Step S501 is executed.

The position determination unit 524 calculates the vertex coordinates of the button images when the button images are laid out one by one from the upper left vertex coordinates of the image-capturing area so as not to be superimposed onto each other, based on the respective height and width of the vertex coordinates and button images in the image-capturing area. This determines the positions of the button images in the projected image (Step S504). On this occasion, the position determination unit 524 outputs the vertex coordinates of the image-capturing area and the calculated vertex coordinates of the button images to the inclusion determination unit 527. This enables the inclusion determination unit 527 to determine whether the image-capturing area encompasses the button images (Step S505).

If the inclusion determination unit 527 determines that the image-capturing area encompasses the button images (Yes at Step S505), the projected image generating unit 525 generates the projected image in which the button images are laid out based on the vertex coordinates of the button images determined by the position determination unit 524 and the configuration information of the projected image (Step S506). After that, the projection control unit 126 controls the projection device 40 to project the projected image generated by the projected image generating unit 525 (Step S507).

If the inclusion determination unit 527 determines that the image-capturing area does not encompass the button images (No at Step S505), the position determination unit 524 determines the position of the display switching screen for switching display of the button images (Step S508). The projected image generating unit 525 generates a projected image in which the display switching screen is laid out based on the vertex coordinates of the display switching screen determined by the position determination unit 524 and the configuration information of the projected image stored in the configuration information storage unit 111 (Step S509). After that, the projection control unit 126 controls the projection device 40 to project the projected image generated by the projected image generating unit 525 (Step S507). In the projected image, if any user operation is performed on the display switching screen, a projected image (an image for projection) in which a single button image corresponding to the user operation is laid out is generated and projected. When the single button image is laid out in the projected image, and if the button image is not encompassed in the image-capturing area, then the size of the button image is firstly reduced and the size-reduced button image is laid out in the projected image.

Effects of Fifth Embodiment

The information processing device 500 generates the projected image in which the display switching screen for switching display of the button images in the image-capturing area. As a result, the information processing device 500 can generate a projected image intended by a user without deteriorating the operability of the information processing device 500.

Sixth Embodiment

In the above-described fourth and fifth embodiments, the sizes of a plurality of button images are reduced and laid out in the projected image so as to be laid out encompassed in the image-capturing area, or the display switching screen for switching display of the button images in the projected image is laid out in the projected image. In a sixth embodiment, the following describes selection of either laying out a plurality of reduced button images in the projected image or providing the display switching screen in the projected image.

Configuration of Device According to Sixth Embodiment

Figure 17:
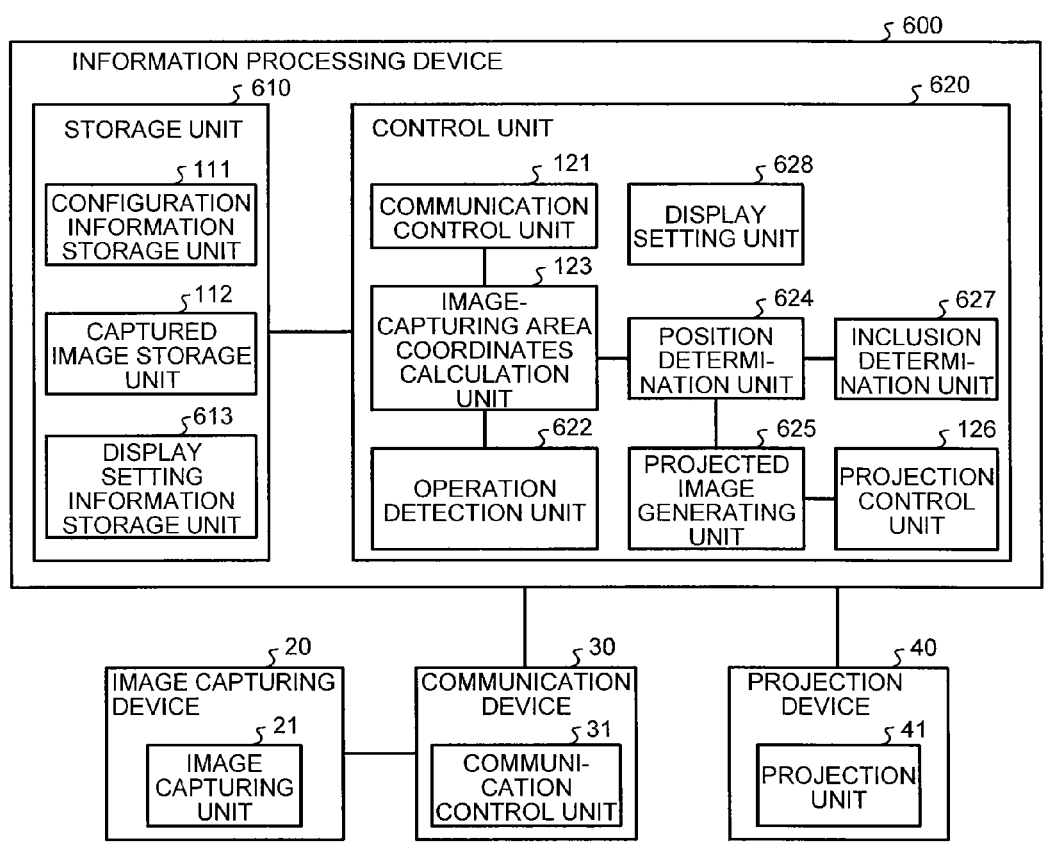
FIG. 17 is a functional block diagram illustrating a configuration example of a device according to a sixth embodiment of the present invention.

The following describes a configuration of a device according to the sixth embodiment with reference to FIG. 17. FIG. 17 is a functional block diagram illustrating a configuration example of a device according to the sixth embodiment. In the sixth embodiment, common numerals are assigned to similar components to the first embodiment, and overlapping explanation thereof may be omitted. Specifically, the functions, configurations, and processes for the components in the sixth embodiment are the same as those for the components in the first embodiment except for a display setting information storage unit 613, an operation detection unit 622, a position determination unit 624, a projected image generating unit 625, an inclusion determination unit 627, and a display setting unit 628.

As illustrated in FIG. 17, the image capturing device 20 has the image capturing unit 21, the communication device 30 has the communication control unit 31, and the projection device 40 has the projection unit 41. An information processing device 600 has a storage unit 610, a control unit 620, and the storage unit 610 has the configuration information storage unit 111 and the display setting information storage unit 613.

The display setting information storage unit 613 stores therein display setting information for displaying setting items relating to display of the operation target image. More specifically, the display setting information storage unit 613 stores therein display setting information for displaying the projected image in which the size-reduced button images are laid out or display setting information for displaying the projected image in which the display switching screen for switching display of button images are provided. That is, in the present embodiment, one of the pieces of the display setting information described above is stored in the display setting information storage unit 613, whereby an image generating process is executed according to the stored display setting information. The image generating process corresponding to the display setting information for displaying the projected image in which the size-reduced button images are laid out is the same as the process described in the fourth embodiment. The image generating process corresponding to the display setting information for displaying the projected image in which the display switching screen for switching display of the button images is provided is the same as the process described in the fifth embodiment.

The control unit 620 has the communication control unit 121, the operation detection unit 622, the image-capturing area coordinates calculation unit 123, the position determination unit 624, the projected image generating unit 625, the projection control unit 126, the inclusion determination unit 627, and the display setting unit 628.

The display setting unit 628 sets the setting items relating to display of the operation target image. More specifically, the display setting unit 628 receives display setting information on the operation target image, to display a projected image in which the size-reduced button images are laid out, or to display a projected image in which the display switching screen for switching display of the button images is provided. A user makes the setting in advance by using an input device coupled to the information processing device 600, for example. The display setting unit 628 then stores the received display setting information in the display setting information storage unit 613.

The inclusion determination unit 627 determines whether the image-capturing area encompasses operation target images. The position determination unit 624 determines the positions of the size-reduced operation target images in the projected image according to the image-capturing area or the position of the display switching screen for switching the display of the operation target images, based on the display setting information. More specifically, the position determination unit 624 calculates the vertex coordinates of the button images when the button images are laid out one by one from the upper left vertex coordinates out of the vertex coordinates of the image-capturing area calculated by the image-capturing area coordinates calculation unit 123 so as not to be superimposed onto each other. The position determination unit 624 then outputs the vertex coordinates of the image-capturing area and the vertex coordinates of the button images to the inclusion determination unit 627 and instructs the inclusion determination unit 627 to execute the inclusion determination process.

After the inclusion determination unit 627 receives the instruction of the inclusion determination process, the inclusion determination unit 627 determines whether the image-capturing area encompasses the button images based on the vertex coordinates of the image-capturing area and the vertex coordinates of the button images. For example, in the inclusion determination process, if any one of the vertex coordinates of the button images exists outside of the vertex coordinates of the image-capturing area, the inclusion determination unit 627 determines that the image-capturing area does not encompass the button images. The inclusion determination unit 627 then outputs the result of the inclusion determination process whether the image-capturing area encompasses the button images to the position determination unit 624.

This enables the position determination unit 624 to acquire the display setting information from the display setting information storage unit 613 if the inclusion determination unit 627 determines that the image-capturing area does not encompass the button images. If the acquired display setting information is the display setting information for displaying the projected image in which the size-reduced button images are laid out, the position determination unit 624 reduces the sizes of the button images so as to be encompassed in the image-capturing area. In other words, the position determination unit 624 calculates the vertex coordinates of the button images that have been reduced in size so as to be encompassed in the image-capturing area, thereby determining the positions of the button images that have been reduced in size in the projected image.

If the acquired display setting information is the display setting information for displaying the projected image in which the display switching screen for switching display of button images is provided, the position determination unit 624 determines the position of the display switching screen for switching display of button images so as to be encompassed in the image-capturing area. That is, the position determination unit 624 calculates the vertex coordinates of the display switching screen encompassed in the image-capturing area, thereby determining the position of the display switching screen in the projected image. If the inclusion determination unit 627 determines that the image-capturing area encompasses the button images, the same process is executed as the third embodiment.

The projected image generating unit 625 generates a projected image in which the operation target images are laid out or a projected image in which the display switching screen is provided. More specifically, if the position determination unit 624 determines the vertex coordinates of the button images, then the projected image generating unit 625 generates the projected image in which the button images are laid out based on the vertex coordinates of the button images and the configuration information of the projected image stored in the configuration information storage unit 111. If the position determination unit 624 determines the vertex coordinates of the size-reduced button images, then the projected image generating unit 625 generates a projected image in which the size-reduced button images are laid out, based on the vertex coordinates of the button images and the configuration information of the projected image. If the position determination unit 624 determines the position of the display switching screen, then the projected image generating unit 625 generates a projected image in which the display switching screen is provided based on the vertex coordinates of the display switching screen and the configuration information of the projected image.

If a user operation is performed on the projected image in which the display switching screen is provided, which has been generated by the projected image generating unit 625, the operation detection unit 622 detects the user operation performed on the projected image by using the captured image. After that, the position determination unit 624 determines the position of a single button image selected by the user operation, and the projected image generating unit 625 generates a projected image in which the button image of which the position has been determined is provided. When the position of the button image is determined, the inclusion determination process may be executed by the inclusion determination unit 627.

If a user operation is performed on the projected image in which the button images are generated and reduced in size by the projected image generating unit 625, the operation detection unit 622 detects the user operation on any one of the size-reduced button images by using the captured image.

Flow of Image Generating Process According to Sixth Embodiment

Figure 18:
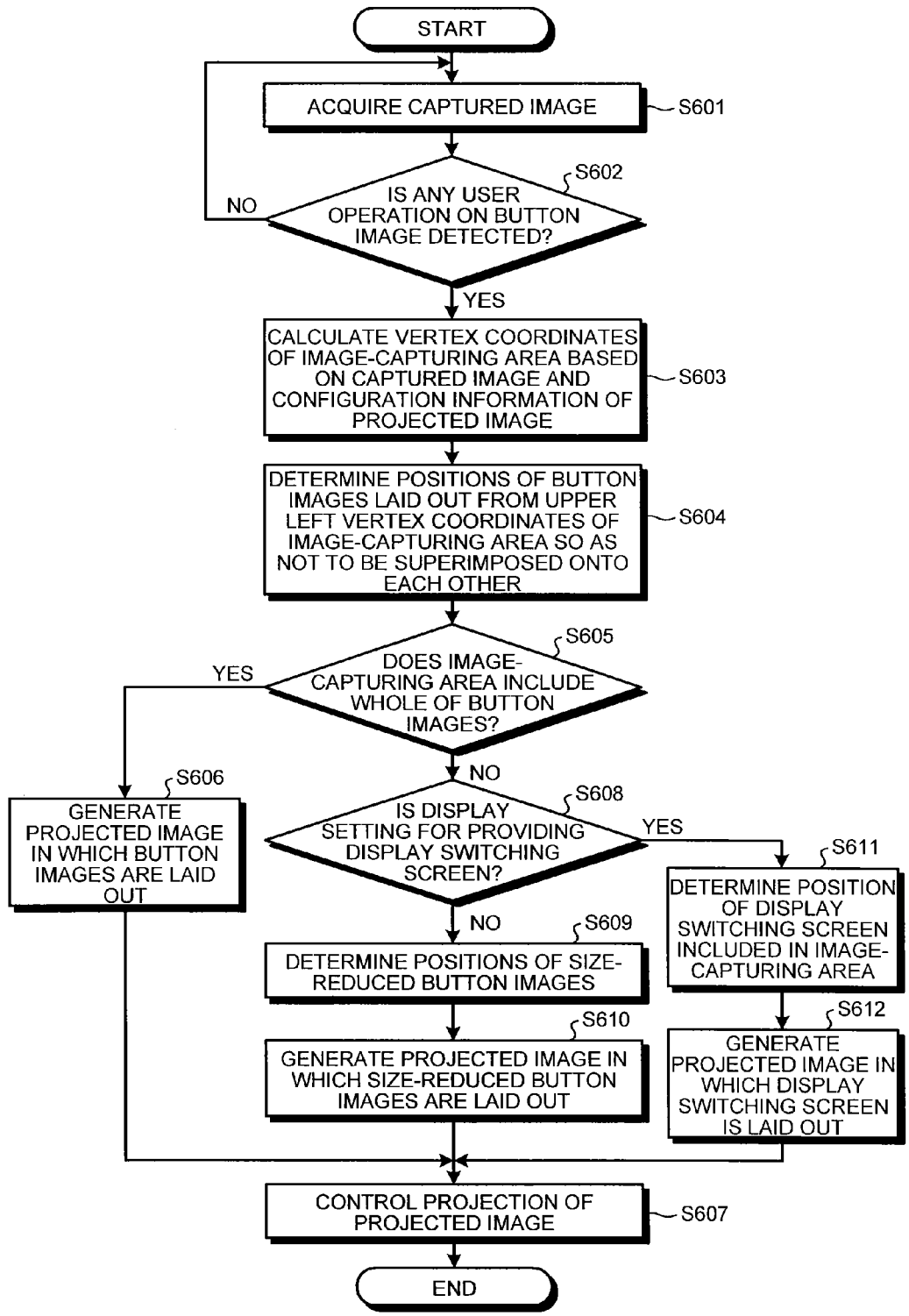
FIG. 18 is a flowchart illustrating a flow of an image generating process according to the sixth embodiment.

The following describes a flow of an image generating process according to the sixth embodiment with reference to FIG. 18. FIG. 18 is a flowchart illustrating a flow of the image generating process according to the sixth embodiment. In the example illustrated in FIG. 18, the image generating process is started triggered by detecting a user operation.

As illustrated in FIG. 18, the operation detection unit 622 acquires a captured image from the captured image storage unit 112 (Step S601). The operation detection unit 622 attempts to detect any user operation on the button image from the captured image (Step S602). If the operation detection unit 622 detects any user operation on the button image (Yes at Step S602), the image-capturing area coordinates calculation unit 123 calculates the vertex coordinates of the image-capturing area based on the captured image and the configuration information of the projected image stored in the configuration information storage unit 111 (Step S603). If the operation detection unit 622 detects no user operation on the button image (No at Step S602), the process at Step S601 is executed.

The position determination unit 624 calculates the respective vertex coordinates of the button images when the button images are laid out one by one from the upper left vertex coordinates of the image-capturing area so as not to be superimposed onto each other, based on the respective height and width of the vertex coordinates and button images in the image-capturing area. This determines the positions of the button images in the projected image (Step S604). On this occasion, the position determination unit 624 outputs the vertex coordinates of the image-capturing area and the calculated vertex coordinates of the button images to the inclusion determination unit 627. This enables the inclusion determination unit 627 to determine whether the image-capturing area encompasses the button images (Step S605).

If the inclusion determination unit 627 determines that the image-capturing area encompasses the button images (Yes at Step S605), the projected image generating unit 625 generates a projected image in which the button images are laid out based on the vertex coordinates of the button images determined by the position determination unit 624 and the configuration information of the projected image (Step S606). After that, the projection control unit 126 controls the projection device 40 to project the projected image generated by the projected image generating unit 625 (Step S607).

If the inclusion determination unit 627 determines that the image-capturing area does not encompass the button images (No at Step S605), the position determination unit 624 acquires the display setting information from the display setting information storage unit 613 and determines whether the display setting indicates that the display switching screen is to be provided (Step S608).

If the acquired display setting information is the display setting information for displaying the projected image in which the size-reduced button images are laid out (No at Step S608), the position determination unit 624 calculates the vertex coordinates of the button images that have been reduced in size so as to be encompassed in the image-capturing area, thereby determining the positions of the size-reduced button images in the projected image (Step S609). The projected image generating unit 625 generates a projected image in which the size-reduced button images are laid out based on the vertex coordinates of the size-reduced button images determined by the position determination unit 624, and the configuration information of the projected image (Step S610). After that, the projection control unit 126 controls the projection device 40 to project the projected image generated by the projected image generating unit 625 (Step S607).

If the acquired display setting information is the display setting information for displaying the projected image in which the display switching screen is provided (Yes at Step S608), the position determination unit 624 determines the position of the display switching screen for switching display of button images so as to be encompassed in the image-capturing area (Step S611). The projected image generating unit 625 generates a projected image in which the display switching screen is provided based on the vertex coordinates of the display switching screen determined by the position determination unit 624, and the configuration information of the projected image (Step S612). After that, the projection control unit 126 controls the projection device 40 to project the projected image generated by the projected image generating unit 625 (Step S607). In the projected image, if any user operation is performed on the display switching screen, a projected image in which a single button image corresponding to the user operation performed is laid out is generated and projected. When the single button image is laid out in the projected image, and if the button image is not encompassed in the image-capturing area, then the size of the button image is firstly reduced and the size-reduced button image is laid out in the projected image.

Effects of Sixth Embodiment

The information processing device 600 executes an image generating process according to the display setting for displaying the projected image in which the display switching screen is provided in the image-capturing area, or the display setting for displaying the projected image in which the size-reduced button images are laid out in the image-capturing area. As a result, the information processing device 600 can generate a projected image intended by a user without deteriorating the operability of the information processing device 600.

Seventh Embodiment

In the above-described the first embodiment, the vertex coordinates of the button image when the center of gravity of the button image is superimposed onto the center of gravity of the image-capturing area is obtained, thereby determining the position of the button image in the projected image. In a seventh embodiment, the following describes changing the size of the button image.

Configuration of Device According to Seventh Embodiment

Figure 19:
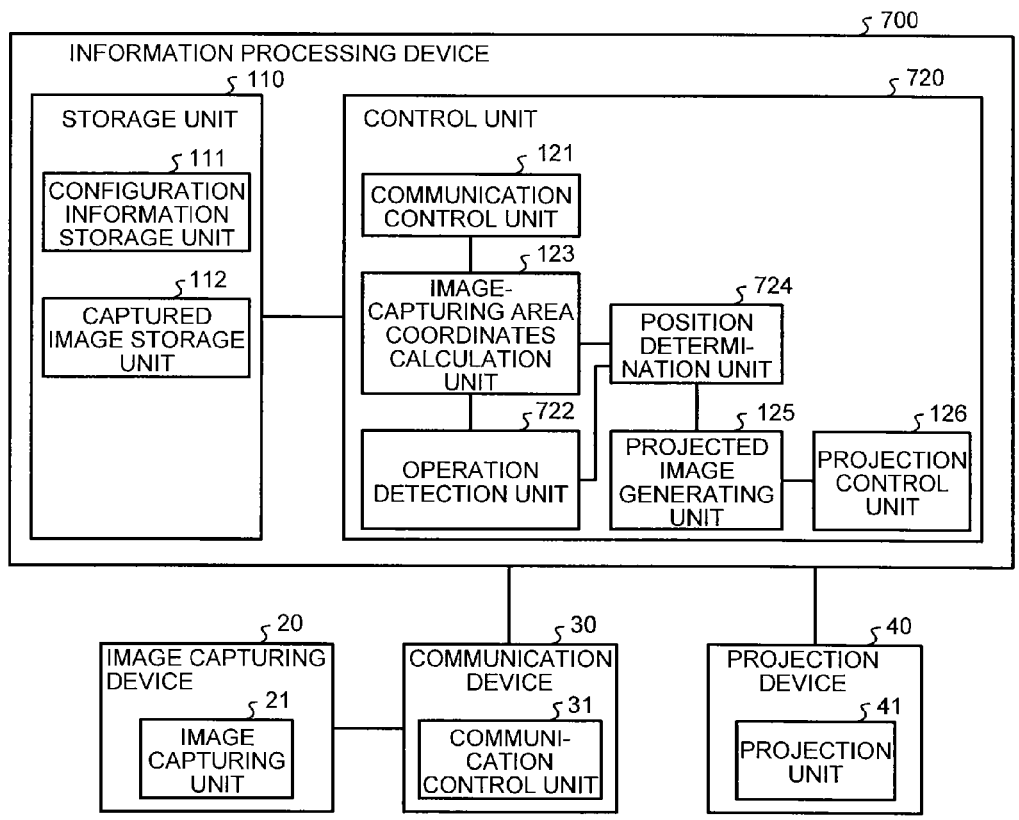
FIG. 19 is a functional block diagram illustrating a configuration example of a device according to a seventh embodiment of the present invention.

The following describes a configuration of a device according to the seventh embodiment with reference to FIG. 19. FIG. 19 is a functional block diagram illustrating a configuration example of the device according to the seventh embodiment. In the seventh embodiment, common numerals are assigned to similar components to the first embodiment, and overlapping explanation thereof may be omitted. Specifically, the functions, configurations, and processes for the components in the seventh embodiment are the same as those for the components in the first embodiment except for an operation detection unit 722 and a position determination unit 724.

As illustrated in FIG. 19, the image capturing device 20 has the image capturing unit 21, the communication device 30 has the communication control unit 31, and the projection device 40 has the projection unit 41. An information processing device 700 has the storage unit 110 and a control unit 720, and the storage unit 110 has the configuration information storage unit 111 and the captured image storage unit 112. The control unit 720 has the communication control unit 121, the operation detection unit 722, the image-capturing area coordinates calculation unit 123, the position determination unit 724, the projected image generating unit 125, and the projection control unit 126.

The operation detection unit 722 detects any user operation for changing the size of the operation target image. More specifically, the operation detection unit 722 detects any user operation for magnifying or reducing the size of the button image in the captured image. The operation detection unit 722 then outputs a notification that a user operation for magnifying or reducing the size of the button image has been detected to the position determination unit 724.

As an aspect of the embodiment, an object representing magnification and an object representing reduction are provided in the vicinity of the button image for changing the size of the button image. Performing a user operation on the objects corresponds to a magnifying process or a reducing process that is executed on the button image. If the object representing magnification and the object representing reduction are not provided, the magnifying process or the reducing process may be executed on the button image by detecting a predetermined action (a user operation) for magnifying or reducing the size of the button image. Alternatively, the object representing magnification and the object representing reduction may be provided in the vicinity of the button image if a predetermined action (a user operation) for magnifying or reducing the size of the button image is detected in a state in which the object representing magnification and the object representing reduction are not provided.

The position determination unit 724 determines the position of the operation target image in the projected image. More specifically, if the operation detection unit 722 detects any user operation for magnifying the button image, the position determination unit 724 determines the position of the button image that has been magnified. If the operation detection unit 722 detects any user operation for reducing the size of the button image, the position determination unit 724 determines the position of the button image that has been reduced in size. The position of the button image that has been magnified or the position of the button image that has been reduced in size can be obtained by calculating the vertex coordinates of the button image when the center of gravity of the magnified button image or the center of gravity of the reduced button image is superimposed onto the center of gravity of the image-capturing area, in the same manner as the first embodiment.

Figure 20:
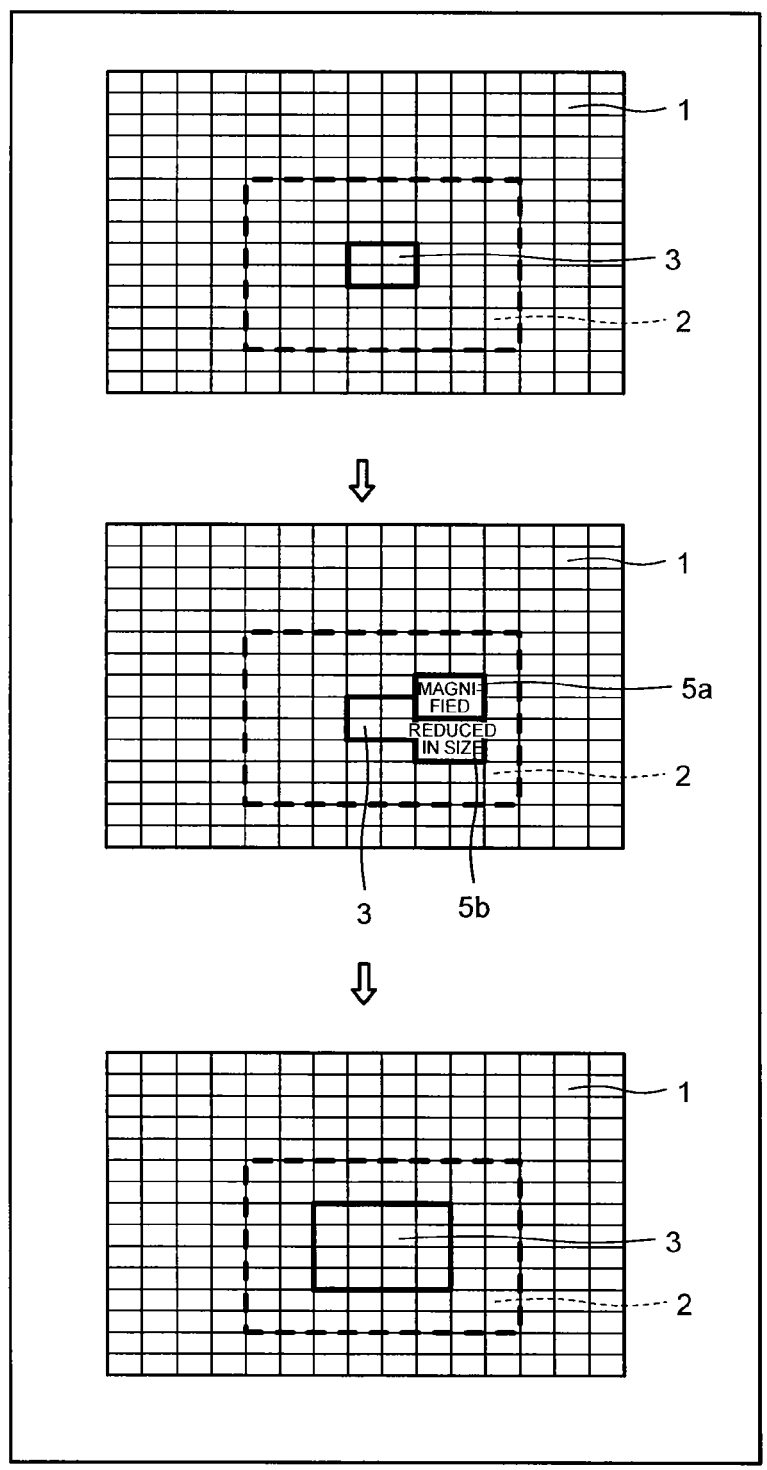
FIG. 20 is a diagram illustrating a layout example of button images according to the seventh embodiment.

FIG. 20 is a diagram illustrating a layout example of the button images according to the seventh embodiment. With reference to FIG. 20, the following describes an example in which the magnifying process or the reducing process is executed on the button image in the state in which the object for magnifying or the object for reducing the size of the button image are not provided. In the example illustrated in the upper diagram in FIG. 20, the four vertex coordinates of the image-capturing area 2 indicate (4, 2), (4, 10), (12, 2), and (12, 10), respectively. The projected image 1 includes the image-capturing area 2 having the above-described vertex coordinates. The size of the image-capturing area 2 has a width of "2" and a height of "2". The image-capturing area 2 encompasses the button image 3 having the four vertex coordinates (7, 5), (7, 7), (9, 5), and (9, 7).

In the above-described state, the operation detection unit 722 detects any user operation for displaying an object used for magnifying or an object used for reducing the size of the button image 3. On this occasion, the object used for magnifying the button image 3 is determined as a "magnifying button image 5*a*" and the object used for reducing the size of the button image 3 is determined as a "reducing button image 5b". If the operation detection unit 722 detects any user operation for displaying the magnifying button image 5a and the reducing button image 5b, the position determination unit 724 determines the positions of the magnifying button image 5a and the reducing button image 5b in the projected image 1. The magnifying button image 5a and the reducing button image 5b are disposed in the vicinity of the button image 3 as illustrated in the middle diagram in FIG. 20. The magnifying button image 5a and the reducing button image 5b are provided so as to be encompassed in the image-capturing area 2 based on the vertex coordinates of the image-capturing area 2. If the image-capturing area 2 is too small or the button image 3 is too large for the image-capturing area 2 to be able to encompass the magnifying button image 5a and the reducing button image 5b, the magnifying button image 5a and the reducing button image 5b may be provided overlapping the button image 3.

After that, the operation detection unit 722 detects the user operation on the magnifying button image 5a or the user operation on the reducing button image 5b. This enables the position determination unit 724 to determine the position of the magnified button image 3 if the operation detection unit 722 detects the user operation on the magnifying button image 5a. This also enables the position determination unit 724 to determine the position of the size-reduced button image 3 if the operation detection unit 722 detects the user operation on the reducing button image 5b. For magnifying or reducing the size of the button image 3, the respective vertex coordinates of the button image 3 are increased or decreased by "1", for example. For further magnifying or reducing the size of the button image 3, the user operation for magnifying or reducing the size of the button image 3 is performed again.

That is, for magnifying the button image 3, the x-coordinate of the lower left vertex of the button image 3 is decreased by "1" and the y-coordinate of the lower left vertex of the button image 3 is decreased by "1". In addition, for magnifying the button image 3, the x-coordinate of the upper left vertex of the button image 3 is decreased by "1" and the y-coordinate is increased by "1". For magnifying the button image 3, the x-coordinate of the lower right vertex of the button image 3 is increased by "1" and the y-coordinate of the lower right vertex of the button image 3 is decreased by "1". For magnifying the button image 3, the x-coordinate of the upper right vertex of the button image 3 is increased by "1" and the y-coordinate of the upper right vertex of the button image 3 is increased by "1".

In the same manner, for reducing the size of the button image 3, the x-coordinate of the lower left vertex of the button image 3 is increased by "1" and the y-coordinate of the lower left vertex of the button image 3 is increased by "1". In addition, for reducing the size of the button image 3, the x-coordinate of the upper left vertex of the button image 3 is increased by "1" and the y-coordinate of the upper left vertex of the button image 3 is decreased by "1". For reducing the size of the button image 3, the x-coordinate of the lower right vertex of the button image 3 is decreased by "1" and the y-coordinate of the lower right vertex of the button image 3 is increased by "1". For reducing the size of the button image 3, the x-coordinate of the upper right of the button image 3 is decreased by "1" and the y-coordinate of the upper right of the button is decreased by "1".

In this example, a user operation for magnifying the size of the button image 3 is detected. For magnifying the button image 3, the position determination unit 724 calculates the four vertex coordinates of the button image 3, (6, 4), (6, 8), (10, 4), and (10, 8), thereby determining the position of the magnified button image 3. As illustrated in the lower diagram in FIG. 20, the projected image 1 is thus generated, in which the magnified center of gravity of the button image 3 is superimposed onto the coordinates of the center of gravity of the image-capturing area 2.

Flow of Image Generating Process According to Seventh Embodiment

Figure 21:
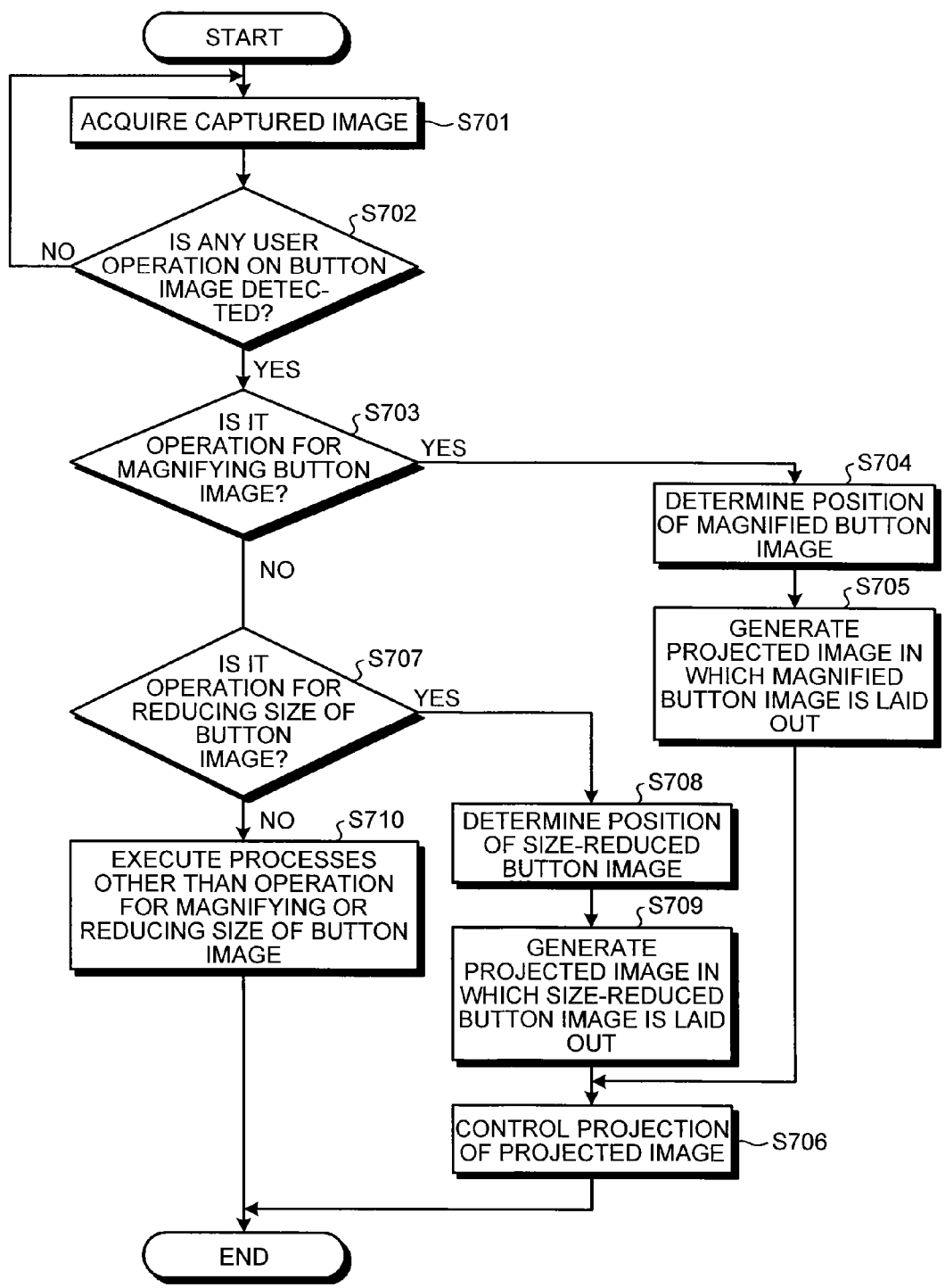
FIG. 21 is a flowchart illustrating a flow of an image generating process according to the seventh embodiment.

The following describes a flow of an image generating process according to the seventh embodiment with reference to FIG. 21. FIG. 21 is a flowchart illustrating a flow of the image generating process according to the seventh embodiment. In the example illustrated in FIG. 21, the image generating process is started triggered by detecting a user operation.

As illustrated in FIG. 21, the operation detection unit 722 acquires a captured image from the captured image storage unit 112 (Step S701). The operation detection unit 722 attempts to detect any user operation on the button image from the captured image (Step S702). If the operation detection unit 722 detects any user operation on the button image (Yes at Step S702), the operation detection unit 722 determines whether the detected user operation is for magnifying the button image (Step S703). If the operation detection unit 122 detects no user operation on the button image (No at Step S702), the process at Step S701 is executed.

If the operation detection unit 722 detects the user operation for magnifying the size of the button image (Yes at Step S703), the position determination unit 724 calculates the vertex coordinates of the magnified button image, thereby determining the position of the magnified button image (Step S704). The projected image generating unit 125 generates a projected image in which the magnified button image is provided based on the vertex coordinates of the magnified button image determined by the position determination unit 724 and the configuration information of the projected image (Step S705). After that, the projection control unit 126 controls the projection device 40 to project the projected image generated by the projected image generating unit 125 (Step S706).

If the operation detection unit 722 detects no user operation for magnifying the button image (No at Step S703), the operation detection unit 722 determines whether the user operation is an operation for reducing the size of the button image (Step S707). If the operation detection unit 722 detects the user operation for reducing the size of the button image (Yes at Step S707), the position determination unit 724 calculates the vertex coordinates of the size-reduced button image, thereby determining the position of the size-reduced button image (Step S708). The projected image generating unit 125 generates a projected image in which the size-reduced button image is provided based on the vertex coordinates of the size-reduced button image determined by the position determination unit 724 and the configuration information of the projected image (Step S709). After that, the projection control unit 126 controls the projection device 40 to project the projected image generated by the projected image generating unit 125 (Step S706).

If the operation detection unit 722 detects no user operation for reducing the size of the button image (No at Step S707), processes other than the user operation for magnifying the button image and the user operation for reducing the size of the button image are executed (Step S710). The processes other than the user operation for magnifying the button image and the user operation for reducing the size of the button image are the various types of processes described in the above-mentioned embodiments.

Effects of Seventh Embodiment

The information processing device 700 determines the position of the magnified or reduced button image according to the user operation performed, thereby generating the projected image in which the button image is laid out on the determined position. As a result, the information processing device 700 can improve the operability of the user operation.

Eighth Embodiment

In the above-described first embodiment, the vertex coordinates of the button image when the center of gravity of the button image is superimposed onto the center of gravity of the image-capturing area are obtained, thereby determining the position of the button image in the projected image. In an eighth embodiment, the following describes change of the position of the button image in the projected image.

Configuration of Device According to Eighth Embodiment

Figure 22:
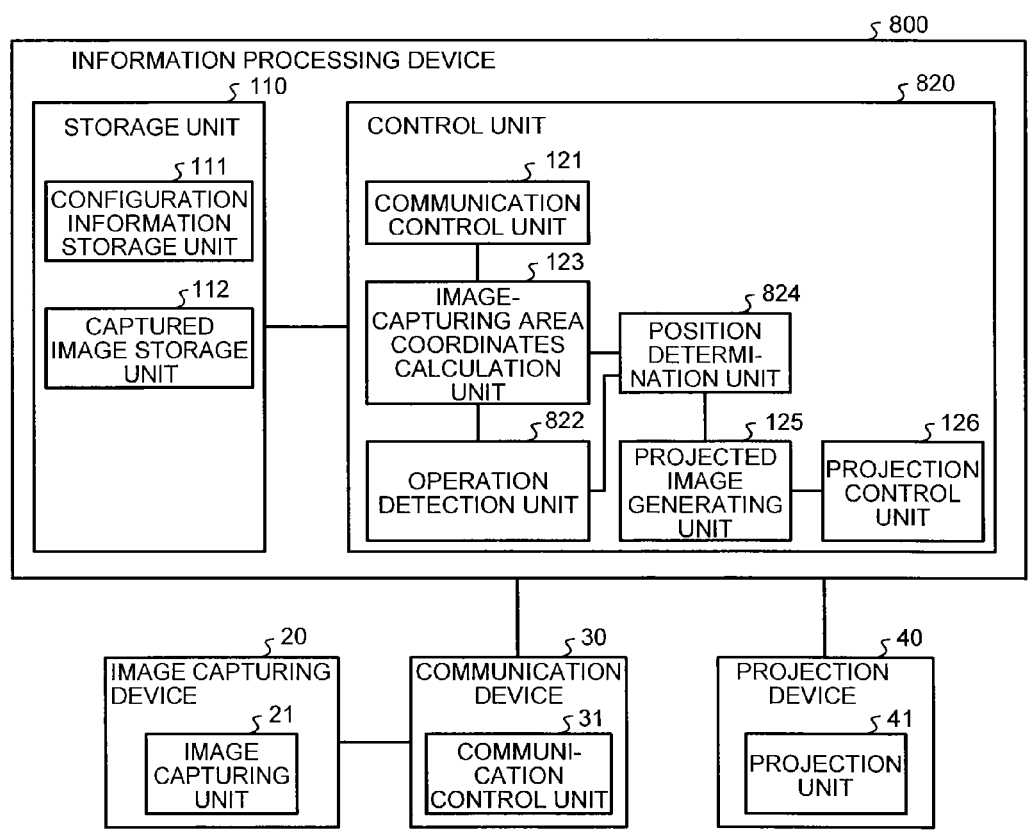
FIG. 22 is a functional block diagram illustrating a configuration example of a device according to an eighth embodiment of the present invention.

The following describes a configuration of a device according to the eighth embodiment with reference to FIG. 22. FIG. 22 is a functional block diagram illustrating a configuration example of the device according to the eighth embodiment. In the eighth embodiment, common numerals are assigned to similar components to the first embodiment, and overlapping explanation thereof may be omitted. Specifically, the functions, configurations, and processes for the components in the eighth embodiment are the same as those for the components in the first embodiment except for an operation detection unit 822 and a position determination unit 824 described below.

As illustrated in FIG. 22, the image capturing device 20 has the image capturing unit 21, the communication device 30 has the communication control unit 31, and the projection device 40 has the projection unit 41. An information processing device 800 has the storage unit 110 and a control unit 820, and the storage unit 110 has the configuration information storage unit 111 and the captured image storage unit 112. The control unit 820 has the communication control unit 121, the operation detection unit 822, the image-capturing area coordinates calculation unit 123, the position determination unit 824, the projected image generating unit 125, and the projection control unit 126.

The operation detection unit 822 detects any user operation for changing the position of the operation target image. More specifically, the operation detection unit 822 detects any user operation for moving the position of the button image in the captured image. The operation detection unit 822 then outputs the moving direction of the button image according to the detected user operation to the position determination unit 824.

The position determination unit 824 determines the position of the operation target image in the projected image. More specifically, if the operation detection unit 822 outputs the moving direction of the button image, the position determination unit 824 determines the position of the moved button image after being moved according to the moving direction. Moving the button image can be achieved by increasing or decreasing the respective vertex coordinates of the button by "1" in the output moving direction. The button image is preferably moved in such a range that the button image is encompassed in the image-capturing area.

Specifically, for moving the button image in the left direction, the x-coordinates of the respective vertex coordinates of the button image are decreased by "1". For moving the button image in the right direction, the x-coordinates of the respective vertex coordinates of the button image is increased by "1". For moving the button image in the upward direction, the y-coordinates of the respective vertex coordinates of the button image are increased by "1". For moving the button image in the downward direction, the y-coordinates of the respective vertex coordinates of the button image are decreased by "1". For moving the button image in any oblique direction, some of the above-described operations are combined with each other. For moving the button image in the upper left direction, for example, the x-coordinates of the respective vertex coordinates of the button image are decreased by "1" and the y-coordinates of the respective vertex coordinates of the button image are increased by "1".

The embodiments according to the present invention may be applied to other uses than the use for a presentation in a meeting or a display of content information to a user in a shop as described above. In the use of display of content information to a user in a shop, if children are to operate the button images, the button image may be moved to a lower position. For another example, advertisers and administrators may lay out the button images before providing a content information service to users. For that purpose, the projected image generated by the projected image generating unit 125 according to the embodiments may be registered in the storage unit 110 for projecting the registered projected image when providing the content information service.

Flow of Image Generating Process According to Eighth Embodiment

Figure 23:
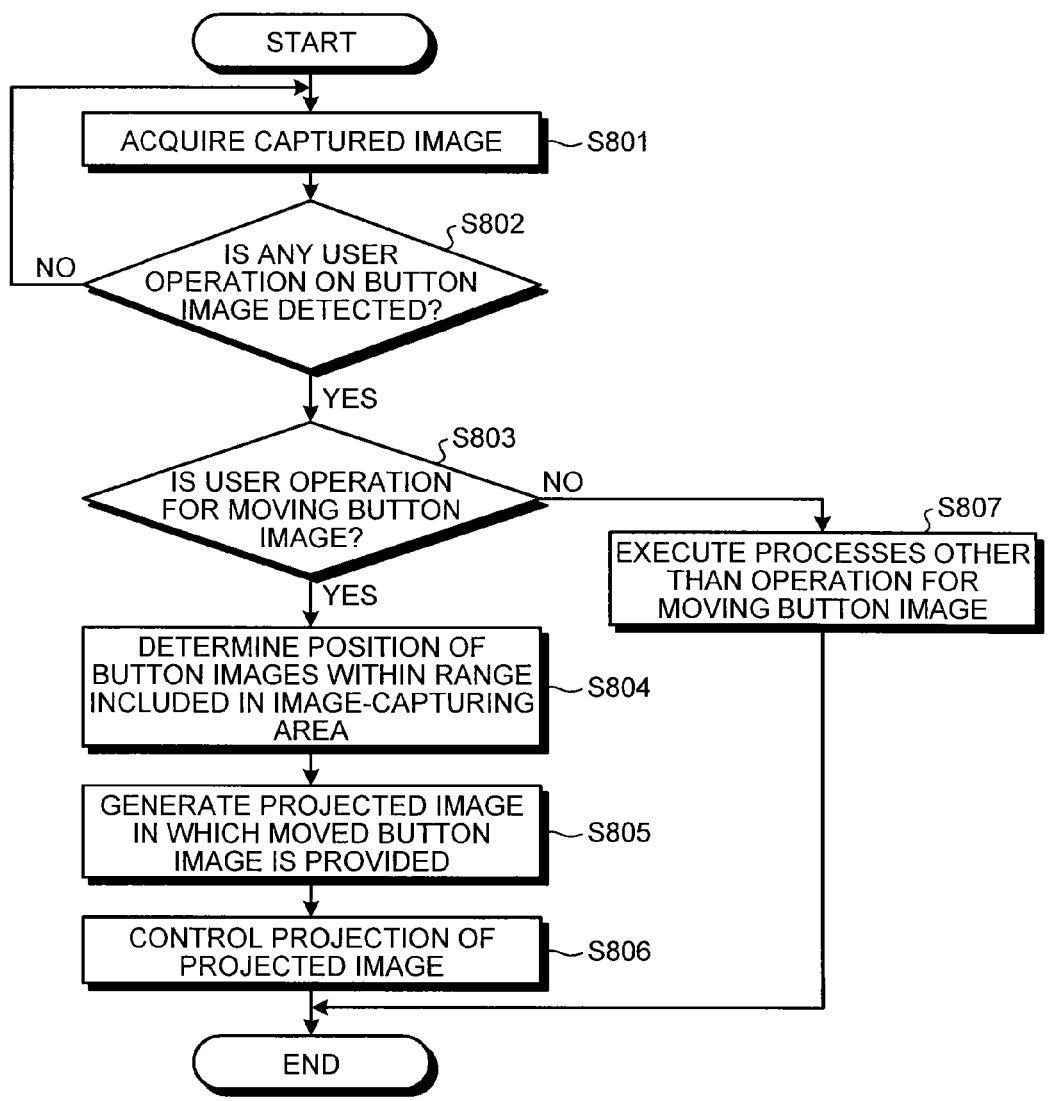
FIG. 23 is a flowchart illustrating a flow of an image generating process according to the eighth embodiment.

The following describes a flow of an image generating process according to the eighth embodiment with reference to FIG. 23. FIG. 23 is a flowchart illustrating a flow of the image generating process according to the eighth embodiment. In the example illustrated in FIG. 23, the image generating process is started triggered by detecting a user operation.

As illustrated in FIG. 23, the operation detection unit 822 acquires a captured image from the captured image storage unit 112 (Step S801). The operation detection unit 822 attempts to detect any user operation on the button image in the captured image (Step S802). If the operation detection unit 822 detects any user operation on the button image (Yes at Step S802), the operation detection unit 822 determines whether the detected user operation is for moving the button image (Step S803). If the operation detection unit 122 detects no user operation on the button image (No at Step S802), the process at Step S801 is executed.

If the operation detection unit 822 detects the user operation for moving the position of the button image (Yes at Step S803), the position determination unit 824 calculates the vertex coordinates of the moved button image according to the moving direction, thereby determining the position of the moved button image (Step S804). The moving amount of the button image is limited to such a range that the image-capturing area encompasses the moved button image. The projected image generating unit 125 generates a projected image in which the moved button image is provided based on the vertex coordinates of the moved button image determined by the position determination unit 824 and the configuration information of the projected image (Step S805). After that, the projection control unit 126 controls the projection device 40 to project the projected image generated by the projected image generating unit 125 (Step S806).

If the operation detection unit 822 detects no user operation for moving the position of the button image (No at Step S803), processes other than the user operation for moving the button image are executed (Step S807). The processes other than the user operation for moving the button image are the various types of processes described in the above-mentioned embodiments.

Effects of Eighth Embodiment

The information processing device 800 determines the position of the moved button image according to the user operation performed, thereby generating the projected image in which the button image is laid out on the determined position. As a result, the information processing device 800 can improve the operability of the user operation and achieve an intended design by the user of the projected image.

Ninth Embodiment

Although certain embodiments of the projection system 10 according to the present invention have been described, the above-described embodiments may be achieved in a variety of other forms. The following therefore describes other embodiments having different aspects from the above-described embodiments as follows: (1) layout of the button images; (2) layout of the display switching screen; (3) the user operation; (4) the shape of the image-capturing area or the object; (5) configuration; and (6) a computer program.

(1) Layout of the Button Images

In the above-described embodiment, if the total width of the button images laid out in the image-capturing area is longer than the width of the image-capturing area, some of the button images are sent to the next line in the image-capturing area and laid out one by one. The button images may be laid out one by one in the y direction rather than in the x direction as described above. When the button images are laid out one by one in the y direction and if the total height of the button images is longer than the width of the image-capturing area, some of the button images are sent to the next line in the image-capturing area and laid out one by one.

In the above-described embodiments, if any one of the vertex coordinates of the button images laid out one by one exists outside of the vertex coordinates of the image-capturing area, it is determined that the image-capturing area does not encompass the button images. Whether the image-capturing area encompasses the button images may be determined by comparing the total area of the button images to the total area of the image-capturing area. Specifically, before the vertex coordinates of the button images are calculated, the areas of the button images are obtained based on the width and the height of each of the button images, and the area of the image-capturing area is obtained based on the vertex coordinates of the image-capturing area. If the total area of the button images is larger than the area of the image-capturing area, the image-capturing area does not encompass the button images. The inclusion determination process is, therefore, not executed and the position determining process and the projected image generating process are executed. Even if the total area of the button images is smaller than that of the image-capturing area, the image-capturing area may not encompass the button images due to the shapes of the button images in some cases; the position determining process, the inclusion determination process, and the projected image generating process are therefore executed.

(2) Layout of the Display Switching Screen

In the above-described embodiments, if the image-capturing area does not encompass the button images, the projected image is generated, in which the display switching screen is provided. The display switching screen may be initially provided in the projected image regardless of whether the image-capturing area encompasses the button images.

In the above-described embodiments, relating to the use of the display switching screen, the projected image in which the display switching screen or the button image is laid out is generated. In the present embodiment, however, the projected image in which both the display switching screen and the button image are laid out may be generated. Specifically, a projected image is generated, in which both the display switching screen and the button image selected by the user operation performed by using the display switching screen are laid out side by side, for example.

(3) User Operation

In the above-described embodiments, the size of the button image is changed according to the user operation on the moving button image or the user operation on the reducing button image. The user operation for changing the size of the button image may be performed through a drag operation. Specifically, the dragged range by the drag operation is detected based on the captured image, thereby changing the size of the button image according to the dragged range.

In the above-described embodiments, the button image is moved according to the user operation in the intended direction for moving the button image. The button image may be moved by providing an object for moving the button image in the projected image and moving the button image according to the user operation on the object. Specifically, the user operation on the object for specifying the moving direction of the button image is detected based on the captured image and the button image is moved according to the specified moving direction. The user operation for moving the button image may be performed through the drag operation. Specifically, the direction and the travel of the drag operation is detected based on the captured image and the button image is moved according to the direction and the travel of the drag operation performed.

(4) Shape of the Image-Capturing Area and the Object

In the above-described embodiments, the captured image, the image-capturing area, and the operation target image such as the button image are in a rectangle shape. These are provided merely for exemplary purpose and they may be in other shapes than a rectangle shape in the present embodiments. For example, if the projected image, the image-capturing area, or the button image is in a circular shape, the minimum size of a rectangle including the circle is used for achieving the above-described embodiments. For the image-capturing area, however, the maximum size of a rectangle included in the image-capturing area may be used because using the minimum size of a rectangle including an image-capturing area in another shape rather than a rectangle shape may increase the size of the image-capturing area itself such that an area that cannot actually detect a user operation will be included.

(5) Configuration

In the above-described embodiments, the process procedures, the control procedures, specific names, various types of data, and information including parameters described herein or in the accompanying drawings may be modified unless otherwise specified. Furthermore, the devices illustrated in the drawings are merely a depiction of concepts or functionality, and are not necessarily configured physically in the manner illustrated in the drawings. In other words, specific configurations in which each of the devices is distributed or integrated are not limited to those illustrated in the drawings. More specifically, the whole or a part of the devices may be distributed or integrated functionally or physically in any units depending on various loads or utilization.

In the above-described embodiments, the projection system 10 has the image capturing device 20, the communication device 30, the projection device 40, and the information processing device 100. The devices may be distributed or integrated functionally or physically in any units. For example, the image capturing device 20, the projection device 40, and the information processing device 100 may be integrated into a single device. Alternatively, only the information processing device 100 and the projection device 40 may be integrated into a single device. Combinations of them may vary.

(6) Computer Program

As an aspect of the embodiments, an image generating program executed by the information processing device 100 is provided in a manner recorded as an installable or executable file format on a computer-readable storage medium, such as a compact disk read-only memory (CD-ROM), a flexible disk (FD), a compact disk recordable (CD-R), and a digital versatile disk (DVD). In addition, the image generating program executed by the information processing device 100 may also be provided in a manner stored in a computer coupled to a network such as the Internet so as to be downloaded through the network. The image generating program executed by the information processing device 100 may also be provided or distributed over a network such as the Internet. Furthermore, the image generating program executed by the information processing device 100 may also be provided in a manner embedded in a ROM, for example.

The image generating program executed by the information processing device 100 have a module structure including the above-described components (the operation detection unit 122, the image-capturing area coordinates calculation unit 123, the position determination unit 124, the projected image generating unit 125, and the projection control unit 126). As an actual hardware structure, the CPU (processor) reads the image generating program from the ROM to be executed, whereby the above-described components are loaded on a main storage unit, so that the operation detection unit 122, the image-capturing area coordinates calculation unit 123, the position determination unit 124, the projected image generating unit 125, and the projection control unit 126 are created on the main storage unit.

An embodiment according to the present invention can provide the advantageous effect of improving detection accuracy of a user operation on a projection device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection system, comprising:
    a projection unit configured to project a projected image on a surface for projection;
    an image capturing unit configured to capture an image-capturing area representing an area in which images are capturable and generate a captured image;
    a configuration information storage unit configured to store configuration information of the projected image;
    a user detection unit configured to detect a part of a user by using the captured image;
    an image-capturing area coordinates calculation unit configured to calculate image-capturing area coordinates for specifying a position of the image-capturing area in the projected image based on the captured image and the configuration information of the projected image when the part of the user is detected by the user detection unit;
    a position determination unit configured to determine, based on the image-capturing area coordinates, a position of an operation target image representing an image to be operated by the user such that a center of gravity of the operation target image is superimposed onto a center of gravity of the image-capturing area;
    a projected image generating unit configured to generate the projected image in which the operation target image is laid out on the determined position; and
    a projection control unit configured to control the projection unit to project the projected image.

2. The projection system according to claim 1, further comprising:
    an inclusion determination unit configured to determine whether the image-capturing area encompasses the operation target image, wherein
    the position determination unit is configured to determine the position of the operation target image that has been reduced in size according to the image-capturing area coordinates when the image-capturing area is determined to not encompass the operation target image.

3. The projection system according to claim 1, wherein
    the position determination unit is configured to determine positions of a plurality of operation target images in the projected image based on the image-capturing area coordinates, and
    the projected image generating unit is configured to generate the projected image in which the operation target images are laid out on the determined positions.

4. The projection system according to claim 3, wherein the position determination unit is configured to determine the positions of the operation target images in the projected image so as not to be superimposed onto each other based on predetermined coordinates of the image-capturing area.

5. The projection system according to claim 3, further comprising:
    an inclusion determination unit configured to determine whether the image-capturing area encompasses the operation target images, wherein
    the position determination unit is configured to determine the positions of the operation target images that have been reduced in size according to the image-capturing area coordinates when the image-capturing area is determined to not encompass the operation target images.

6. The projection system according to claim 1, further comprising:
    an inclusion determination unit configured to determine whether the image-capturing area encompasses a plurality of operation target images, wherein
    the position determination unit is configured to determine a position of a display switching screen for switching display of the operation target images so as to be encompassed in the image-capturing area when the image-capturing area is determined to not encompass the operation target images,
    the projected image generating unit is configured to generate the projected image in which the display switching screen is provided on the determined position, and
    the user detection unit is configured to detect the part of the user on the display switching screen.

7. The projection system according to claim 1, further comprising:
    a display setting unit configured to make a display setting for displaying setting items relating to display of the operation target image; and
    an inclusion determination unit configured to determine whether the image-capturing area encompasses a plurality of operation target images, wherein
    the position determination unit is configured to determine positions of the operation target images that have been reduced in size according to the image-capturing area coordinates or a position of a display switching screen serving as an image for switching display of the operation target images based on the display setting when the image-capturing area is determined to not encompass the operation target images, the projected image generating unit is configured to generate the operation target images that have been reduced in size so as to be encompassed in the image-capturing area, or a projected image in which the display switching screen is provided, and the user detection unit is configured to detect the part of the user on the size-reduced operation target images, or the part of the user on the display switching screen.

8. The projection system according to claim 1, wherein the user detection unit is configured to detect the part of the user for changing a size of the operation target image, and the position determination unit is configured to determine the position of the operation target image in the projected image according to the part of the user for changing the size of the operation target image.

9. The projection system according to claim 1, wherein the user detection unit is configured to detect the part of the user for moving the operation target image, and the position determination unit is configured to determine the position of the operation target image in the projected image according to the part of the user for moving the operation target image.

10. An image generating method, comprising:

detecting a part of a user by using a captured image obtained by capturing an image-capturing area representing an area in which images are capturable;

calculating image-capturing area coordinates for specifying a position of the image-capturing area in a projected image based on the captured image and configuration information of the projected image when the part of the user is detected;

determining a position of an operation target image representing an image to be operated by the user such that a center of gravity of the operation target image is superimposed onto a center of gravity of the image-capturing area based on the image-capturing area coordinates;

generating the projected image in which the operation target image is laid out on the determined position; and controlling a projection device to project the projected image.

11. The image generating method according to claim 10, further comprising:

determining whether the image-capturing area encompasses the operation target image, wherein the determining of the position includes determining the position of the operation target image that has been reduced in size according to the image-capturing area coordinates when the image-capturing area is determined to not encompass the operation target image.

12. The image generating method according to claim 10, wherein the determining of the position includes determining positions of a plurality of operation target images in the projected image based on the image-capturing area coordinates, and the generating includes generating the projected image in which the operation target images are laid out on the determined positions.

13. The image generating method according to claim 12, wherein the determining of the position includes determining the positions of the operation target images in the projected image so as not to be superimposed onto each other based on predetermined coordinates of the image-capturing area.

14. The image generating method according to claim 12, further comprising:

determining whether the image-capturing area encompasses the operation target images, wherein the determining of the position includes determining the positions of the operation target images that have been reduced in size according to the image-capturing area coordinates when the image-capturing area is determined to not encompass the operation target images.

15. The image generating method according to claim 10, further comprising:

determining whether the image-capturing area encompasses a plurality of operation target images, wherein the determining of the position includes determining a position of a display switching screen for switching display of the operation target images so as to be encompassed in the image-capturing area when the image-capturing area is determined to not encompass the operation target images, the generating includes generating the projected image in which the display switching screen is provided on the determined position, and the detecting includes detecting the part of the user on the display switching screen.

16. The image generating method according to claim 10, further comprising:

making a display setting for displaying setting items relating to display of the operation target image; and determining whether the image-capturing area encompasses a plurality of operation target images, wherein the determining of the position includes determining positions of the operation target images that have been reduced in size according to the image-capturing area coordinates or a position of a display switching screen serving as an image for switching display of the operation target images based on the display setting when the image-capturing area is determined to not encompass the operation target images, the generating includes generating the operation target images that have been reduced in size so as to be encompassed in the image-capturing area, or the projected image in which the display switching screen is provided, and the detecting includes detecting the part of the user on the size-reduced operation target images, or the part of the user on the display switching screen.

17. A non-transitory computer-readable storage medium with an executable program stored thereon and executed by a computer, wherein the executable program instructs the computer to perform:

detecting a part of a user operation by using a captured image obtained by capturing an image-capturing area representing an area in which images are capturable;

calculating image-capturing area coordinates for specifying a position of the image-capturing area in a projected image based on the captured image and configuration information of the projected image when the part of the user is detected;

determining a position of an operation target image representing an image to be operated by the user such that a center of gravity of the operation target image is superimposed onto a center of gravity of the image-capturing area based on the image-capturing area coordinates;

generating the projected image in which the operation target image is laid out on the determined position; and controlling a projection device to project the projected image.

* * * * *